Dec. 5, 1939.  R. L. CARR  2,181,869
VEHICLE BODY
Filed Aug. 10, 1935   16 Sheets-Sheet 1

Inventor
Raymond L. Carr

Dec. 5, 1939.   R. L. CARR   2,181,869
VEHICLE BODY
Filed Aug. 10, 1935   16 Sheets-Sheet 2
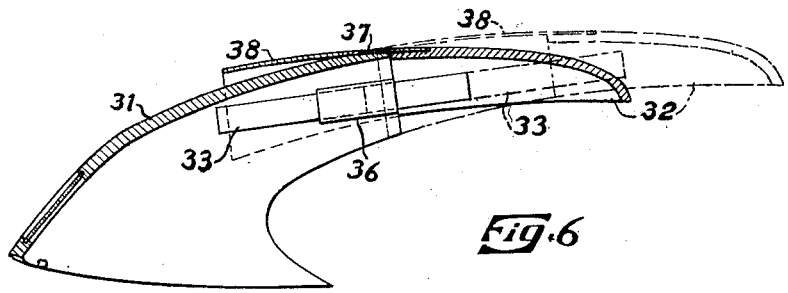
Fig. 6
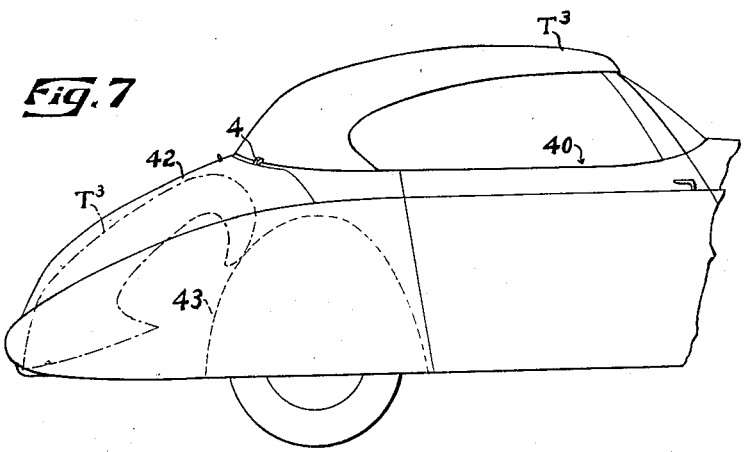
Fig. 7
Fig. 8
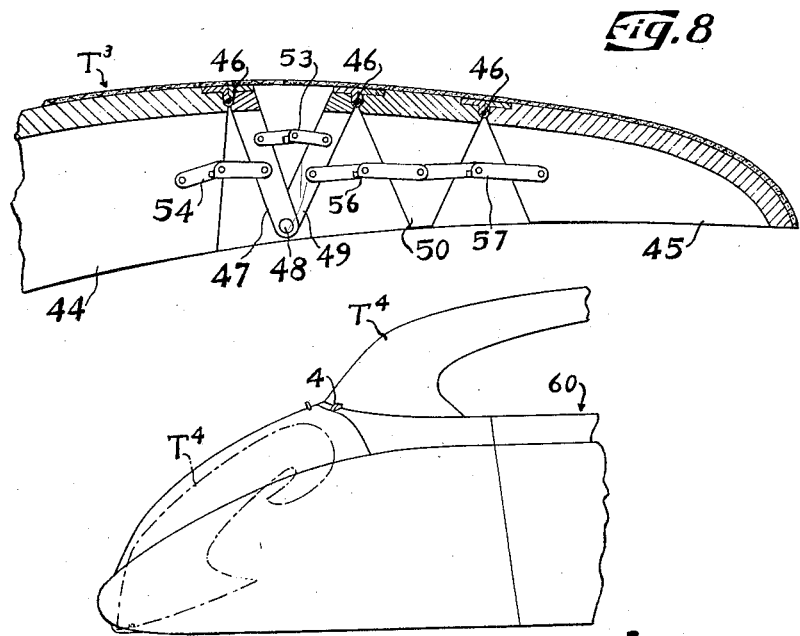
Fig. 9
Inventor
Raymond L. Carr

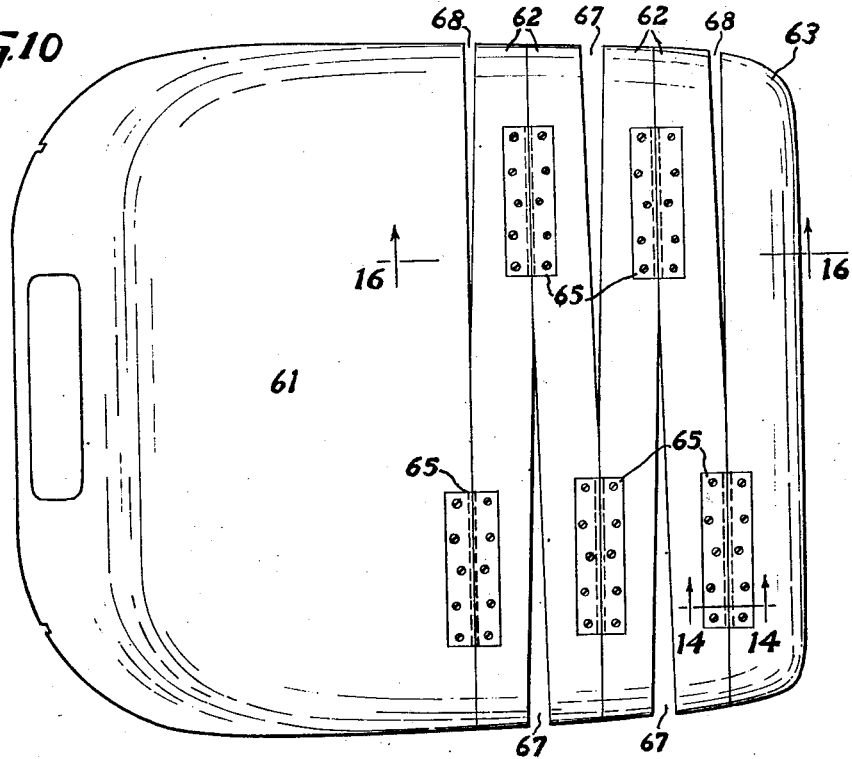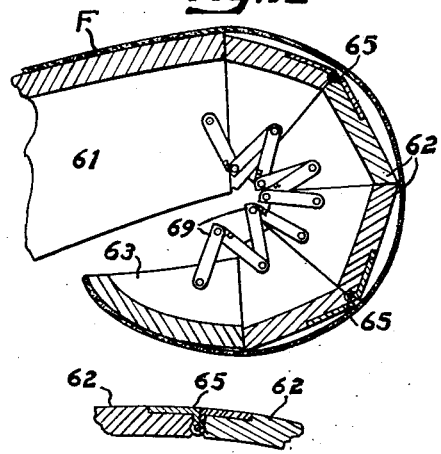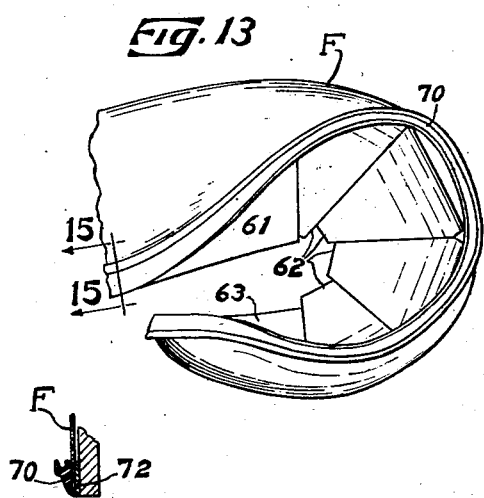

Dec. 5, 1939.  R. L. CARR  2,181,869
VEHICLE BODY
Filed Aug. 10, 1935  16 Sheets-Sheet 4
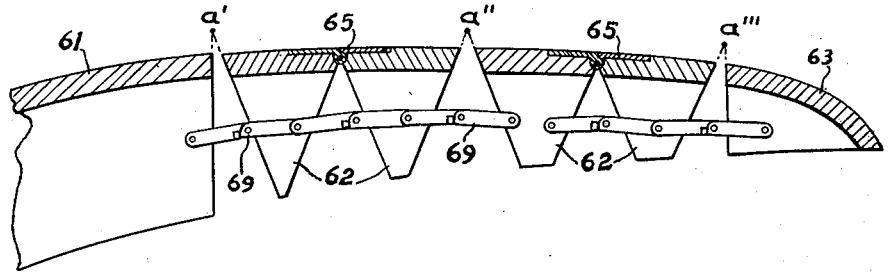
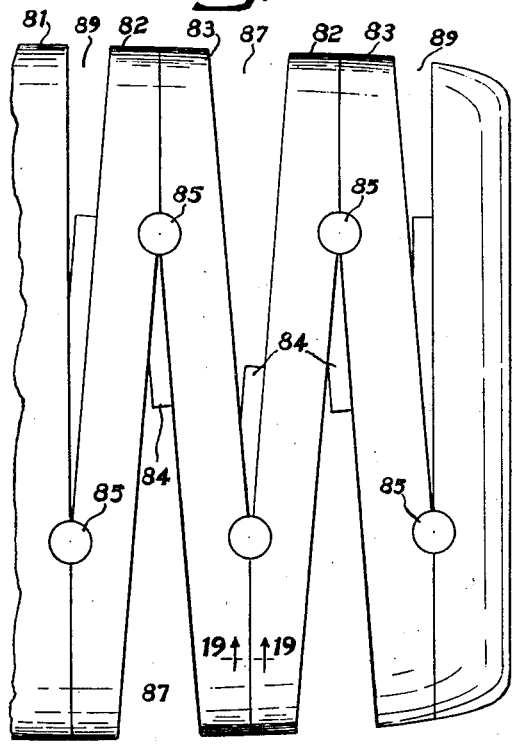
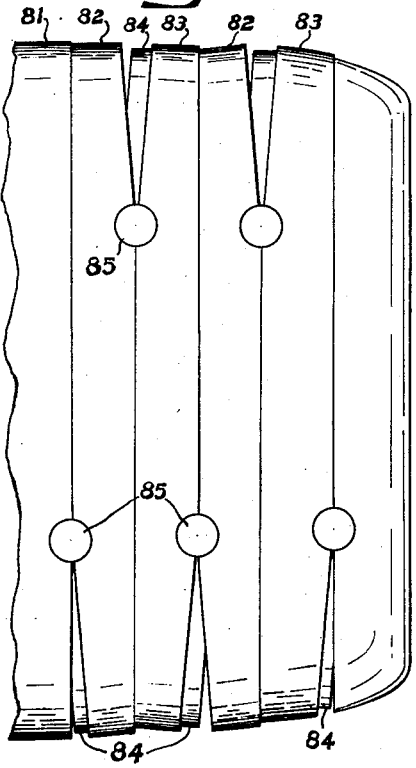
Inventor
Raymond L. Carr Dec. 5, 1939.   R. L. CARR   2,181,869
VEHICLE BODY
Filed Aug. 10, 1935   16 Sheets-Sheet 5

Inventor
Raymond L. Carr

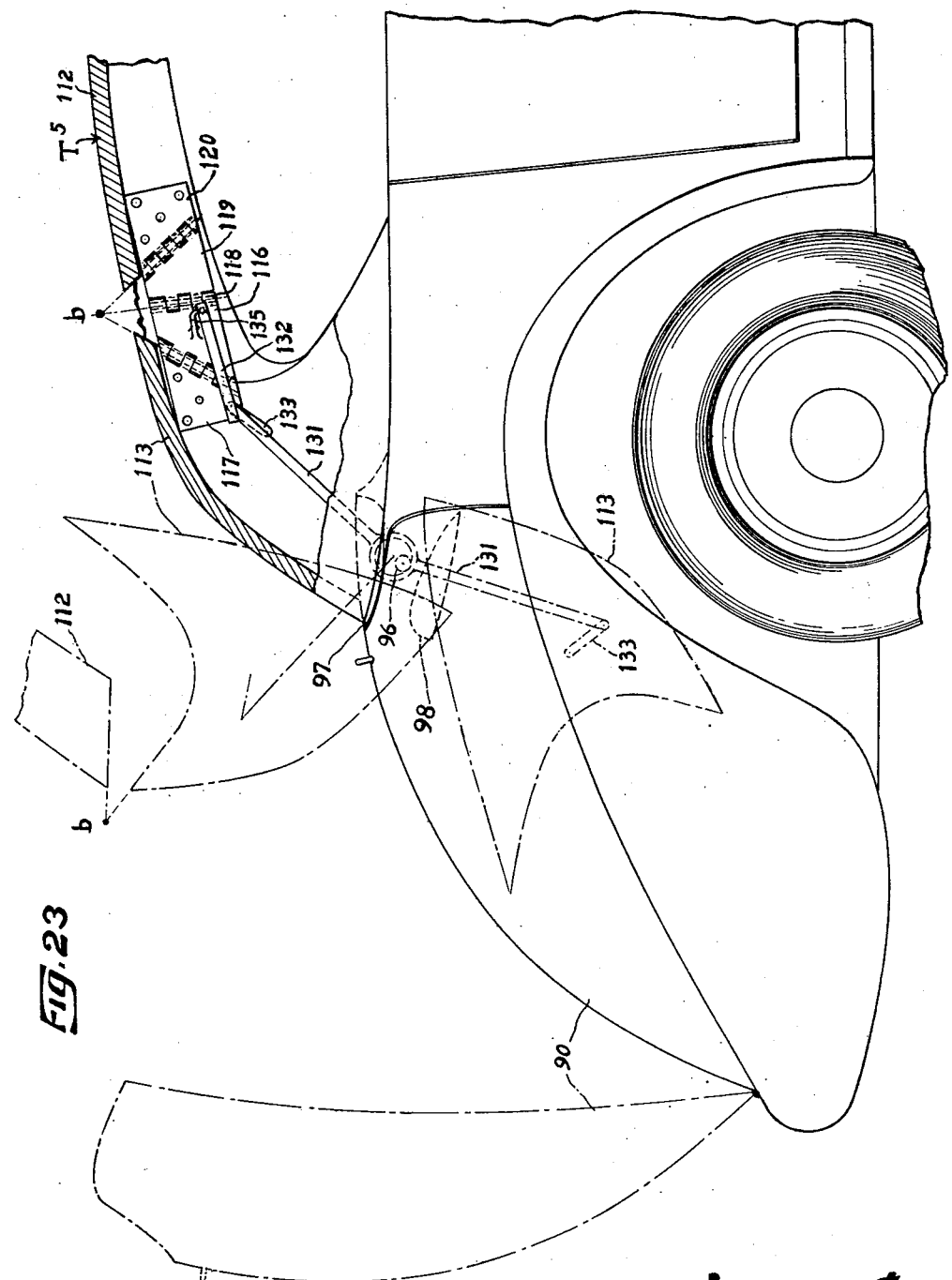

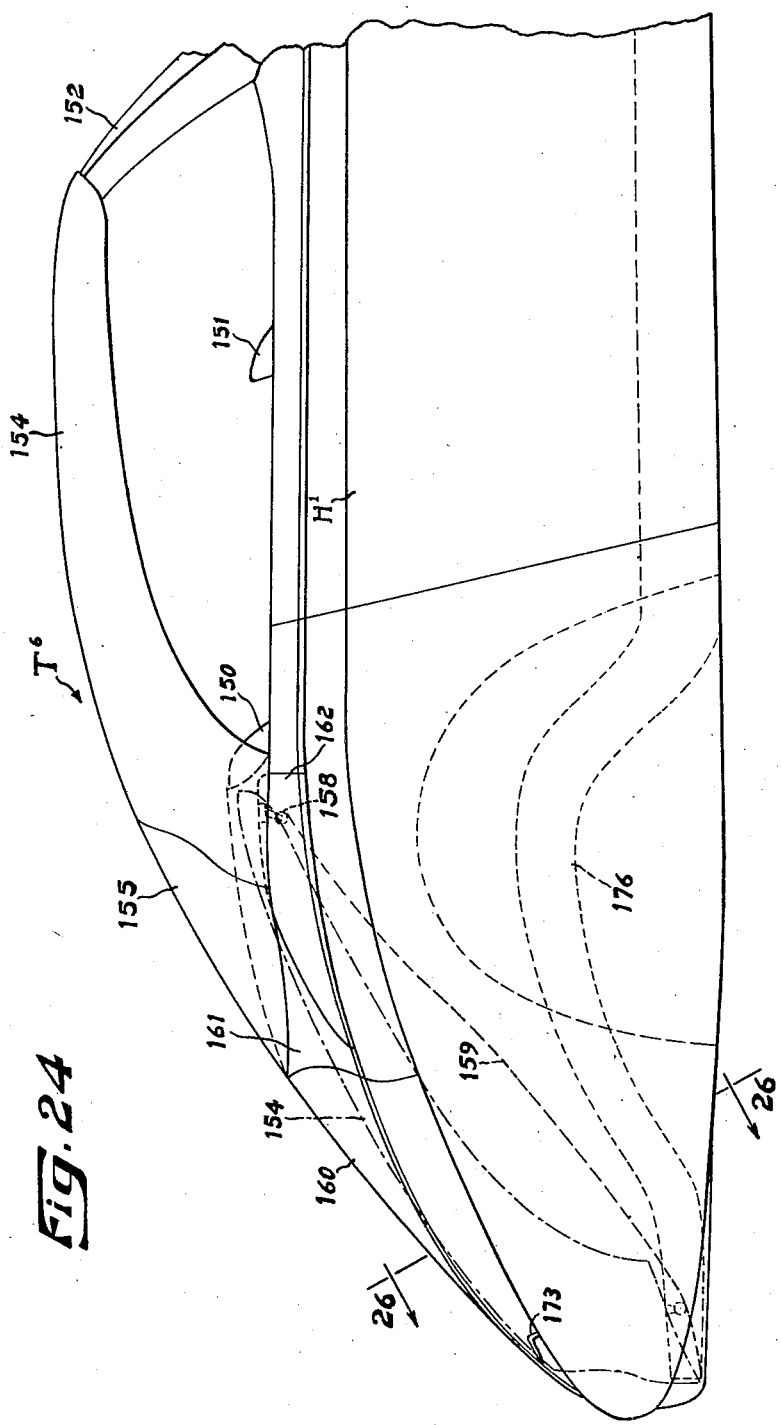

Dec. 5, 1939.  R. L. CARR  2,181,869
VEHICLE BODY
Filed Aug. 10, 1935  16 Sheets-Sheet 8
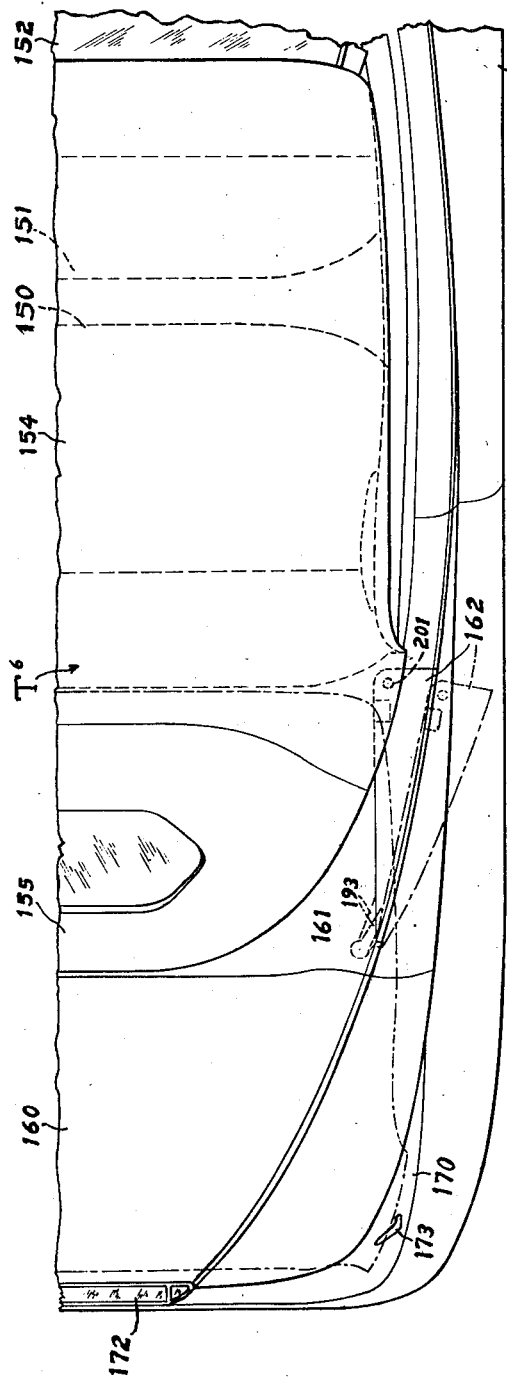
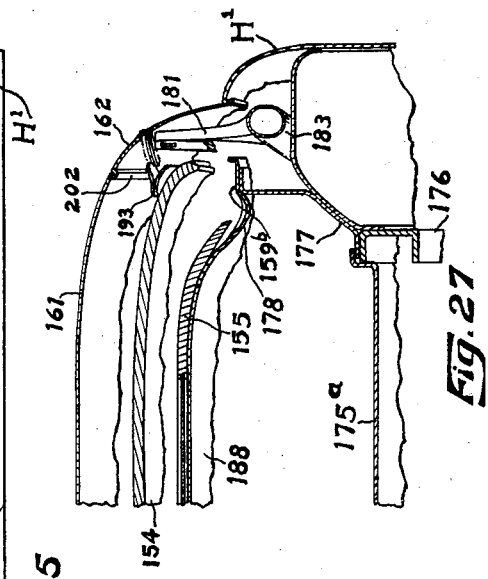
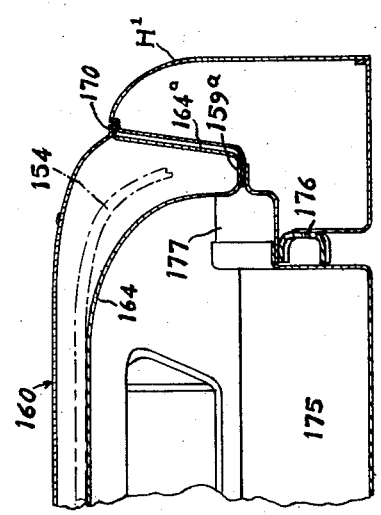
Inventor
Raymond L. Carr Dec. 5, 1939.　　　　R. L. CARR　　　　2,181,869
VEHICLE BODY
Filed Aug. 10, 1935　　　16 Sheets-Sheet 9
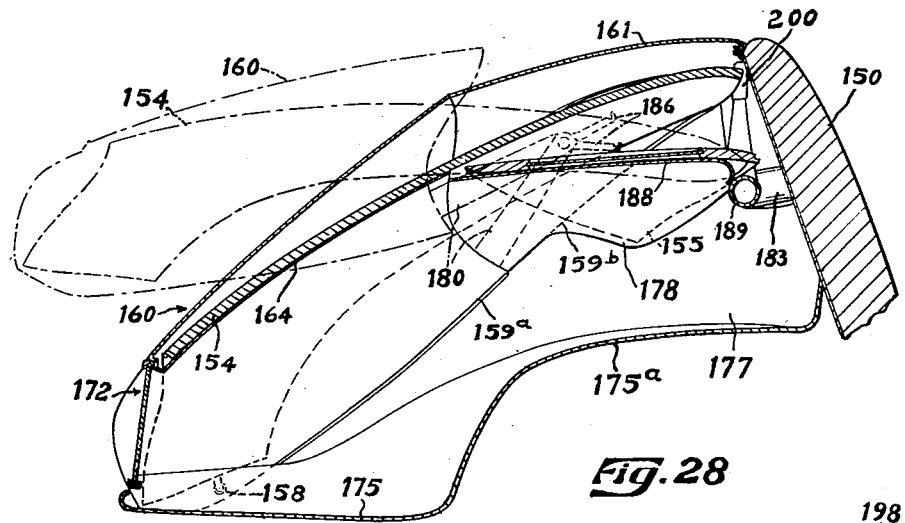
Fig. 28
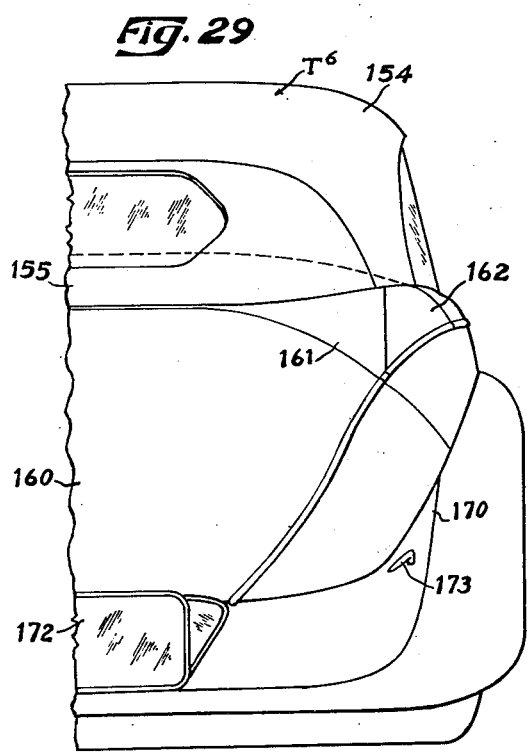
Fig. 29
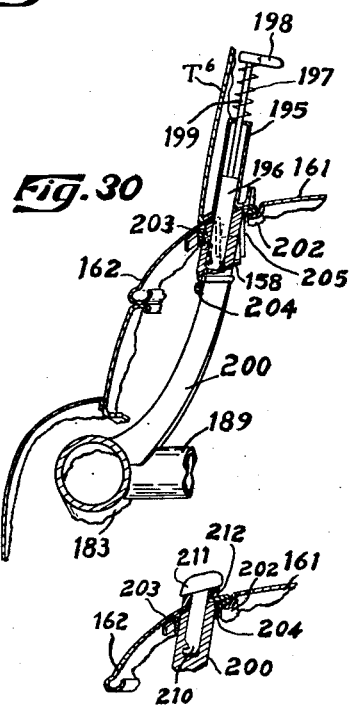
Fig. 30
Fig. 31
Inventor
Raymond L. Carr

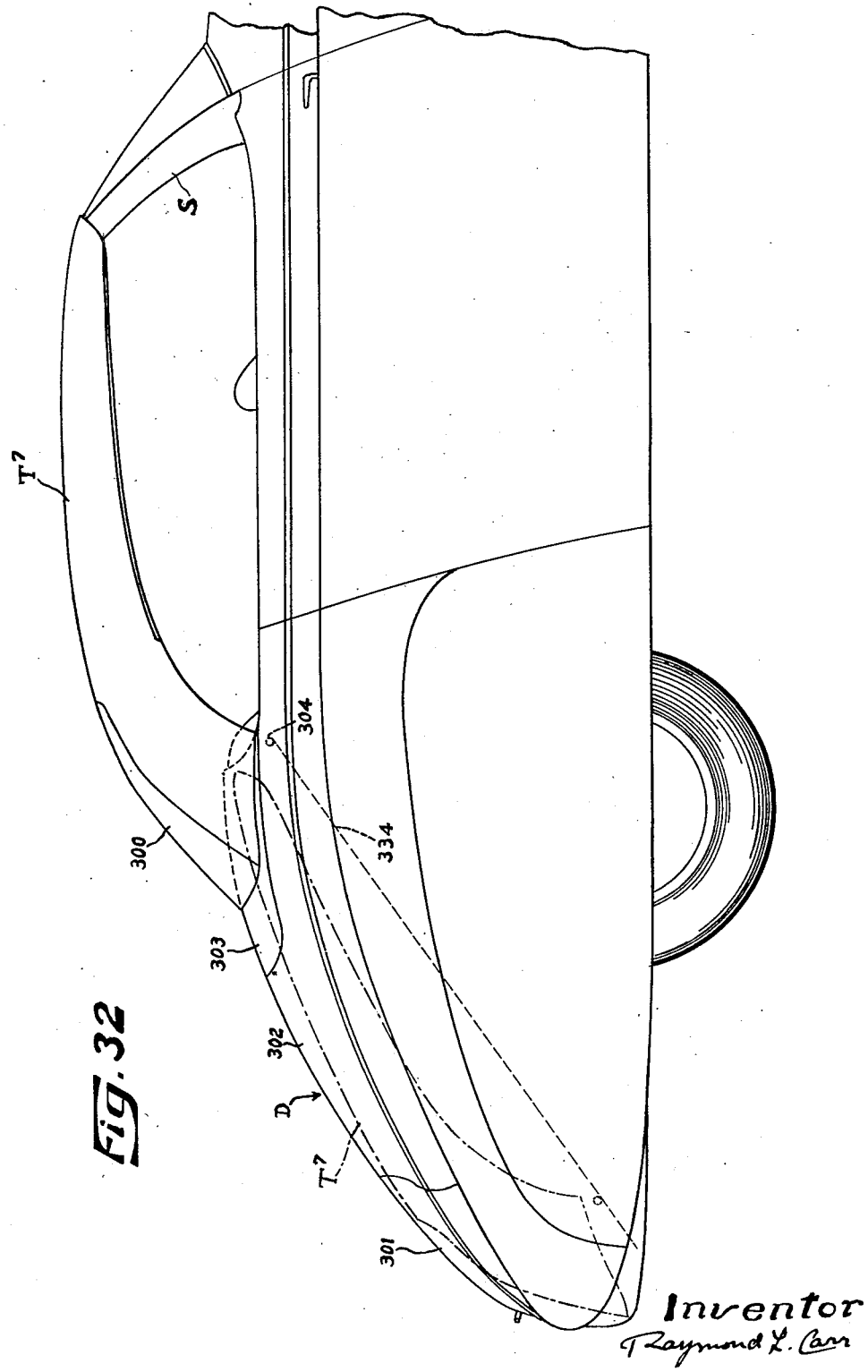

Dec. 5, 1939.  R. L. CARR  2,181,869
VEHICLE BODY
Filed Aug. 10, 1935  16 Sheets-Sheet 11
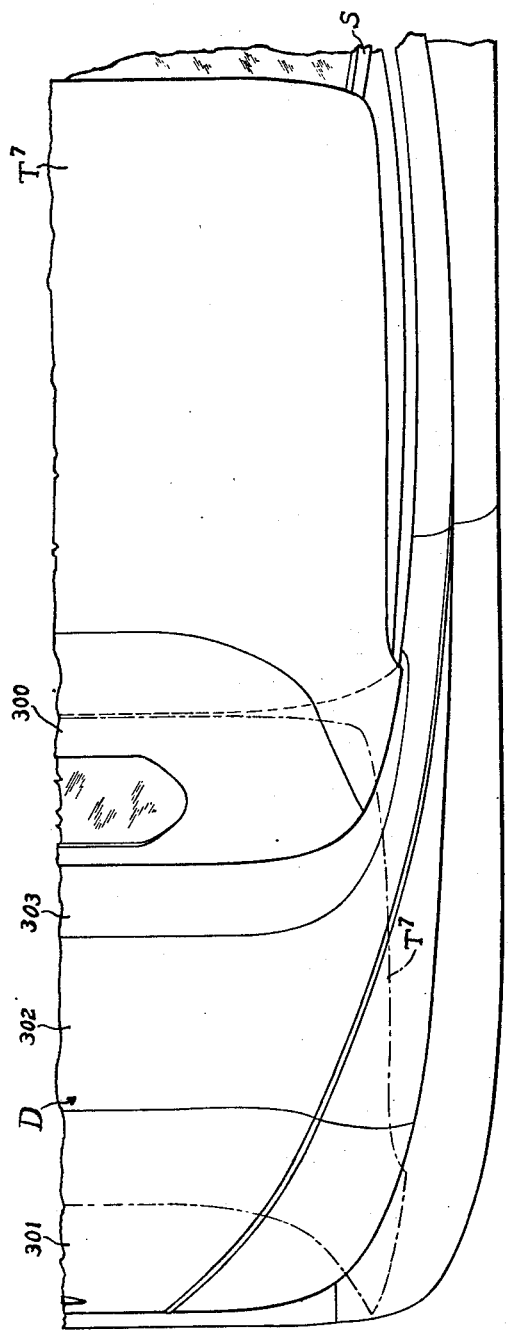
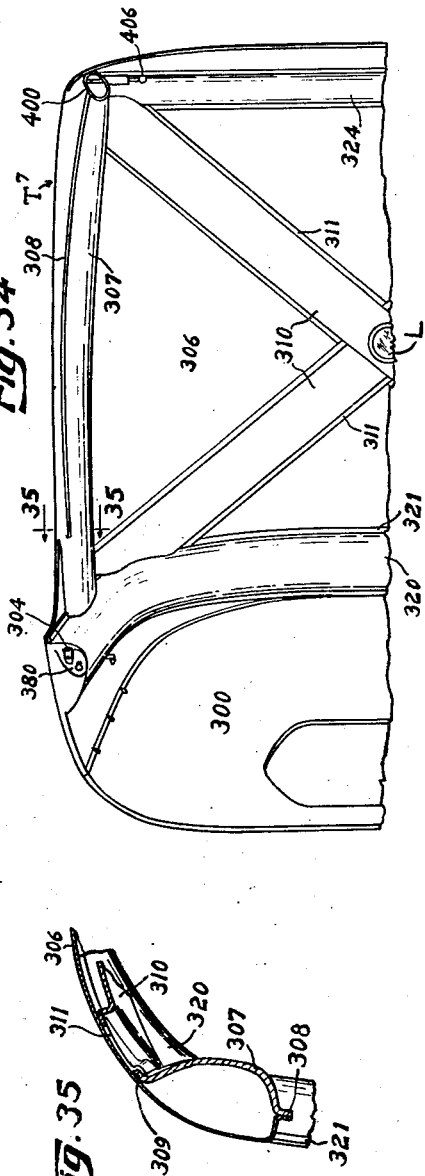
Inventor
Raymond L. Carr Dec. 5, 1939.  R. L. CARR  2,181,869
VEHICLE BODY
Filed Aug. 10, 1935  16 Sheets-Sheet 12
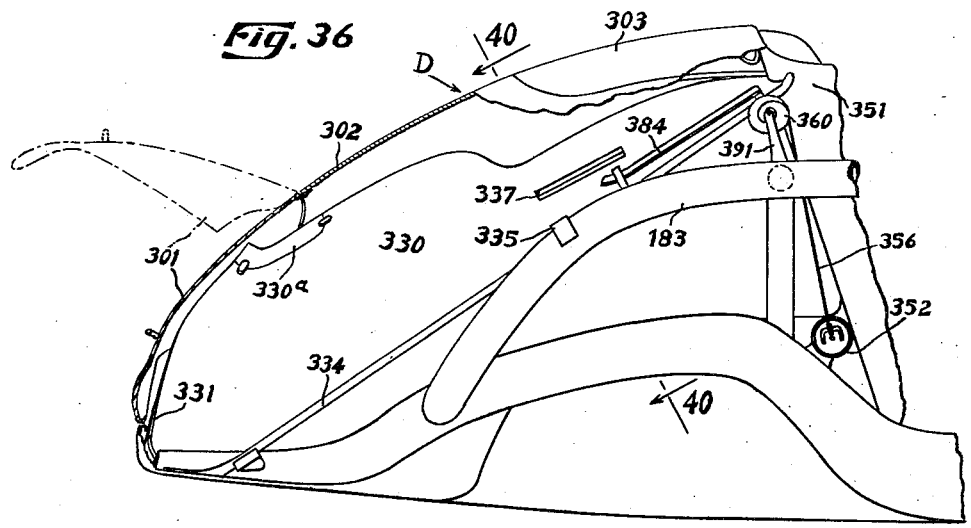
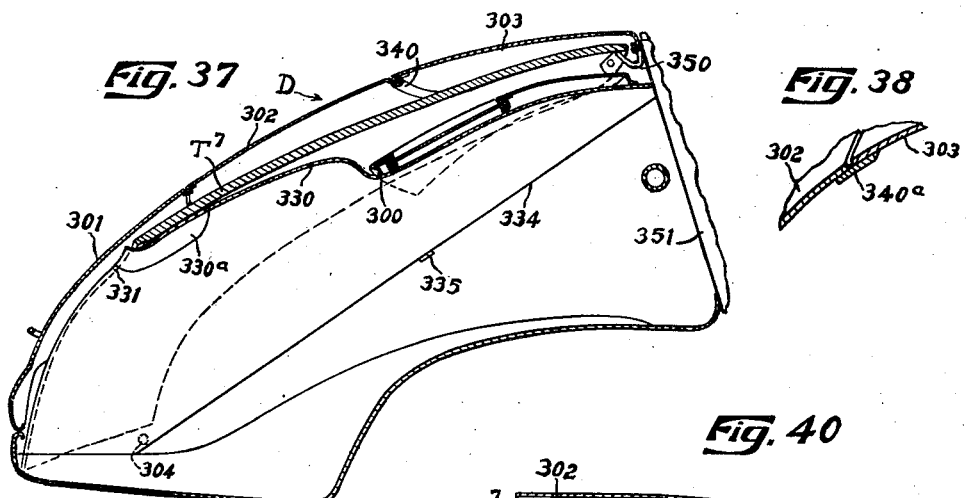
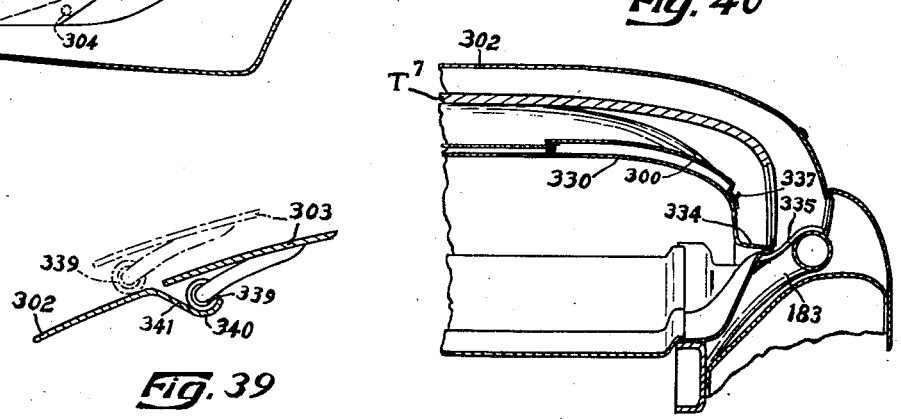
Inventor
Raymond L. Carr

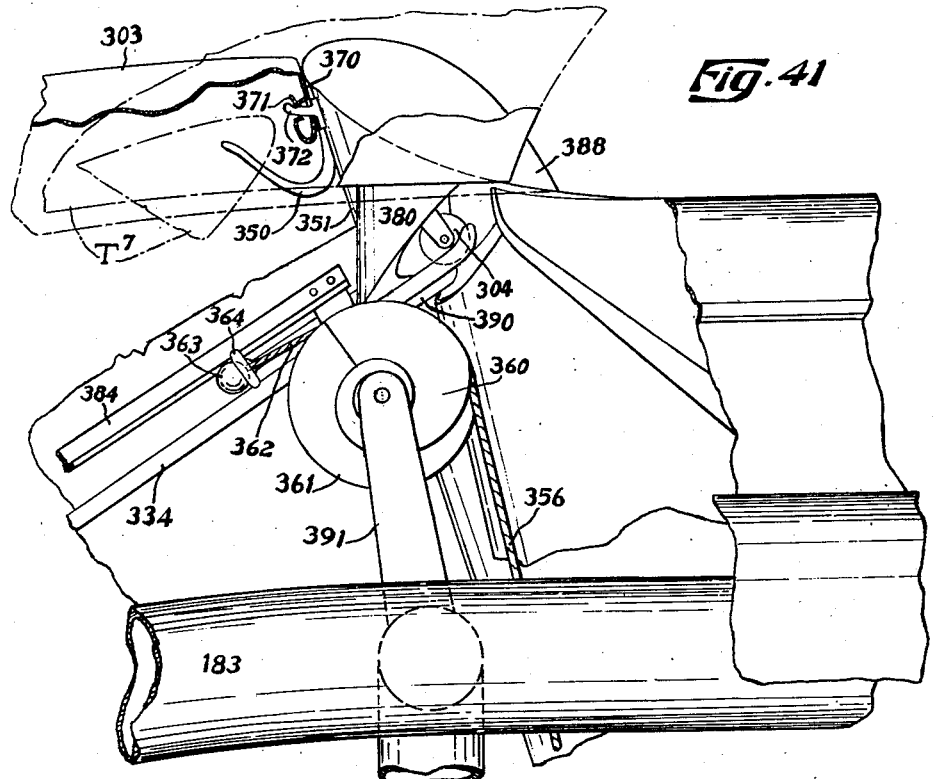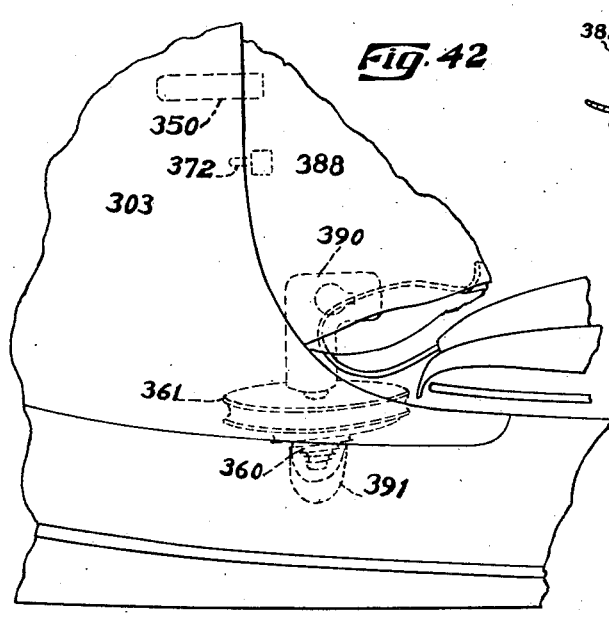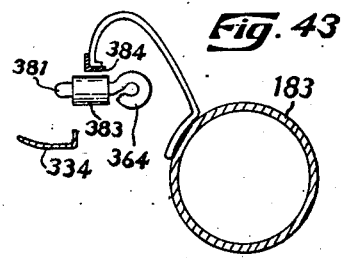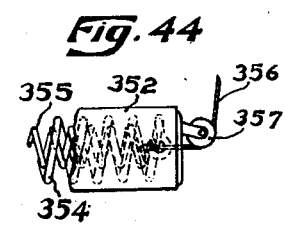

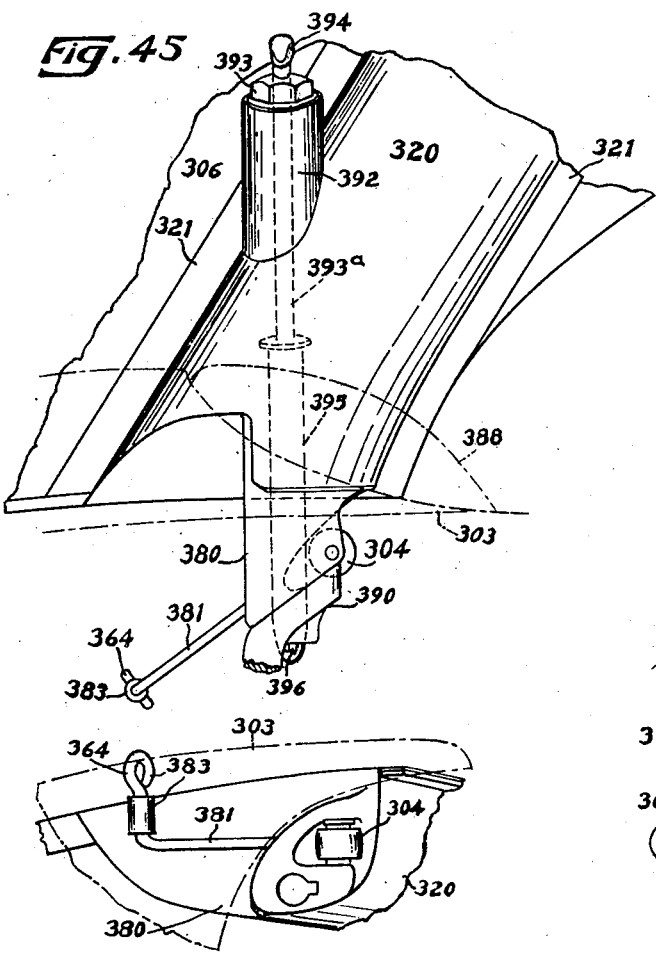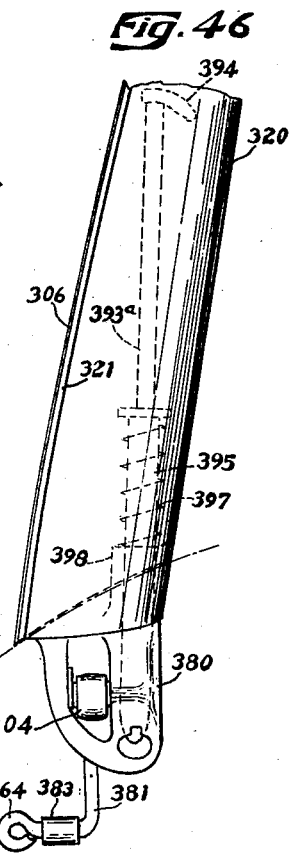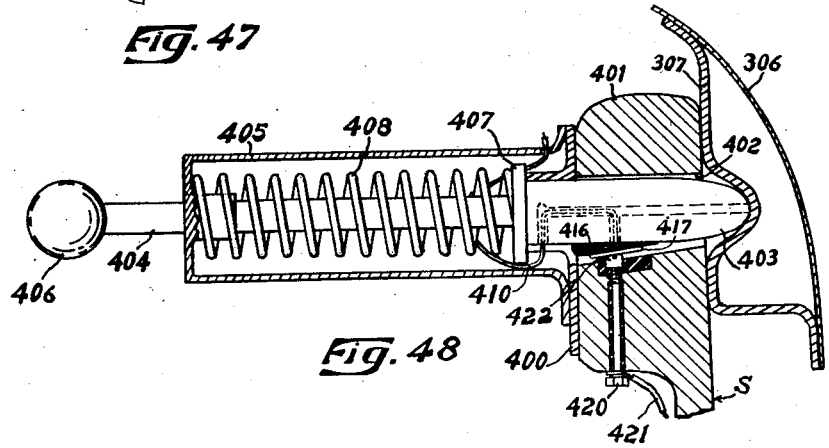

Dec. 5, 1939.  R. L. CARR  2,181,869
VEHICLE BODY
Filed Aug. 10, 1935  16 Sheets-Sheet 15
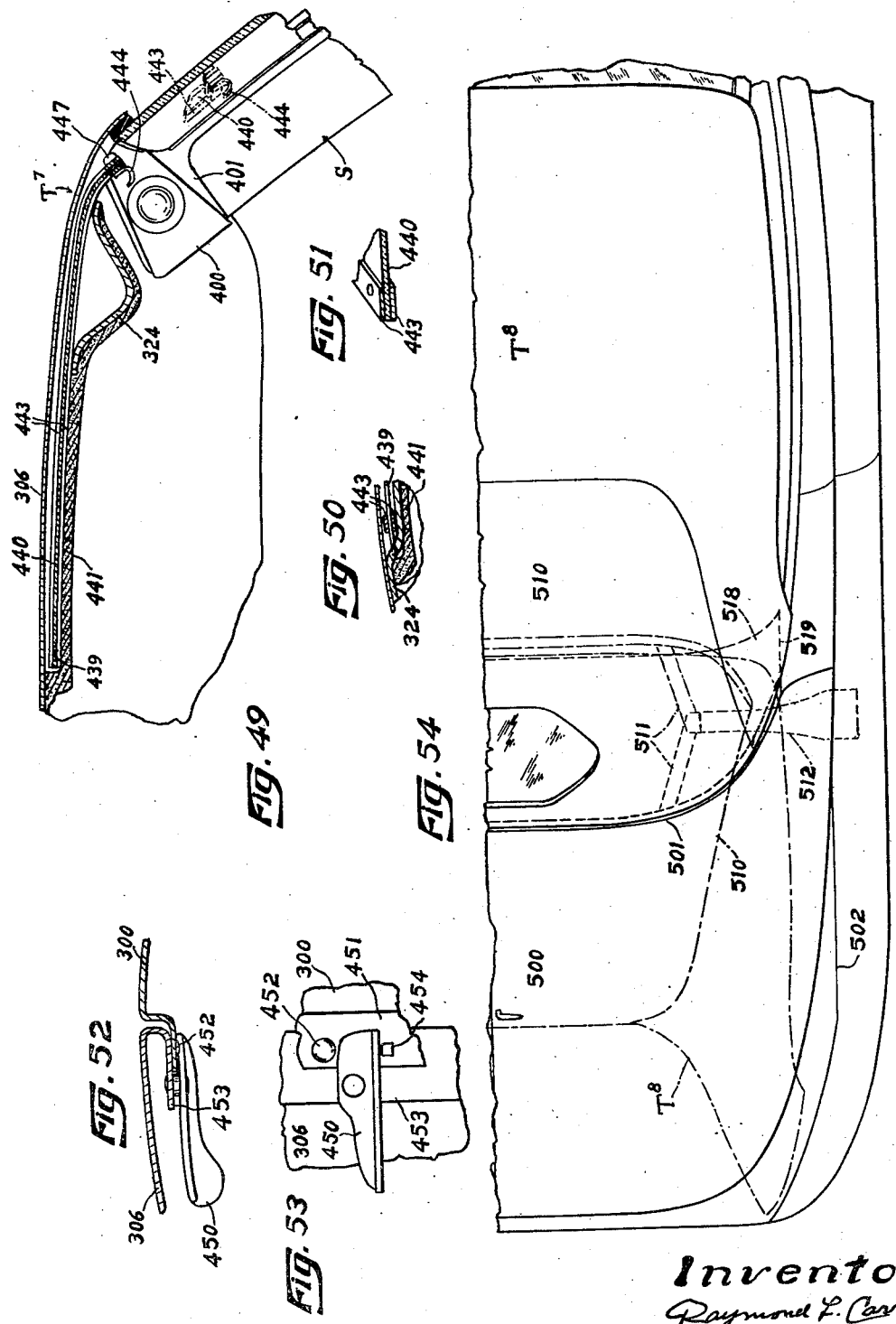
Inventor
Raymond L. Carr Dec. 5, 1939.   R. L. CARR   2,181,869
VEHICLE BODY
Filed Aug. 10, 1935   16 Sheets-Sheet 16
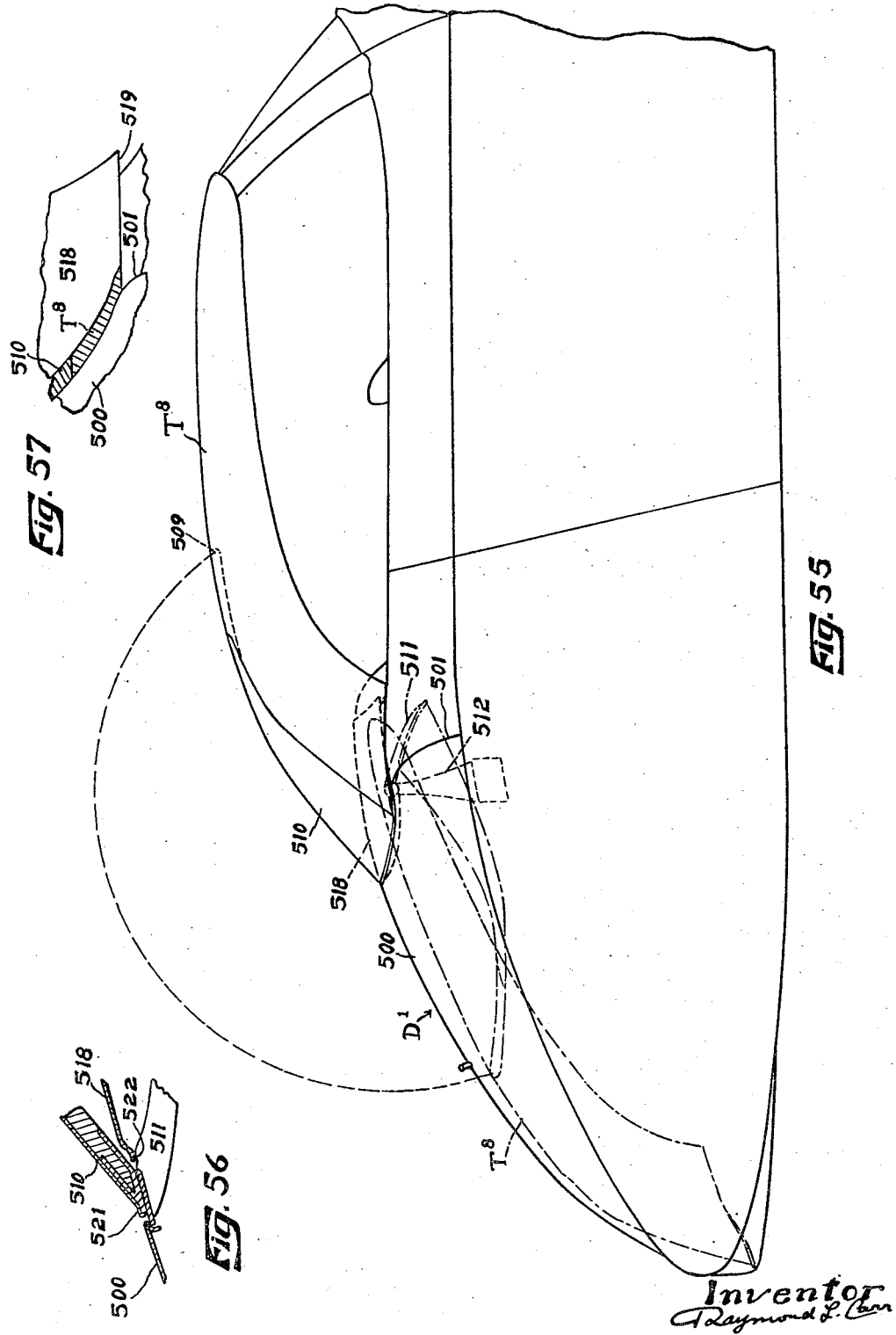
Inventor
Raymond L. Carr Patented Dec. 5, 1939

2,181,869

UNITED STATES PATENT OFFICE 2,181,869

VEHICLE BODY

Raymond L. Carr, Boston, Mass.

Application August 10, 1935, Serial No. 35,610

29 Claims. (Cl. 296—107)

This invention relates to improvements in vehicle bodies and particularly to such bodies having tops which may be lowered, the principal features of the invention relating to tops of this type and to features of body construction which are particularly advantageous when employed in conjunction with such tops.

Heretofore, vehicle bodies have been provided with collapsible or folding tops which have had many distinct disadvantages. Such tops generally have had folding linkages with numerous pivotal connections and have had frame constructions which were relatively light and flimsy. The cloth or sheet covering of such tops has tended to deteriorate rapidly during use, particularly if the top were frequently folded. Objectionable sagging of the fabric has tended to cause such tops to have an unsatisfactory appearance and to become irregular in form; particularly when such tops were folded, the fabric would often be rather sharply creased or subjected to substantial chafing so that localized areas of the fabric became worn and leaky. Furthermore, tops of this type, when raised, depended primarily upon the tensile strength of the fabric to support snow or the like so that substantial strains were imposed on the fabric and particularly the tendency toward sagging was accelerated. Furthermore, the conventional folding top has provided little protection for the occupants of the vehicle in case of serious accident as, for example, when the vehicle overturned.

There have also been various proposals to provide tops comprising rigid sections and capable of being lowered. Such arrangements have not received any substantial practical acceptance due to the objectionable appearance of the majority of such arrangements, due to the complications presented thereby, or the limitations upon body design imposed by their use.

The present invention is particularly intended to avoid these disadvantageous features of earlier tops and in general to provide a collapsible or lowerable top which may be more satisfactory to the user of the vehicle and which, especially in certain embodiments of this invention, may provide all of the primary advantages of the top of a permanently closed car while still permitting the vehicle to be driven as an open car, when desired, with the lowered top entirely concealed.

In addition to affording the cardinal advantages of simplicity and freedom from rattles as well as sturdiness, durability and water-tightness, the present invention particularly provides tops which may be attractive in appearance and which may conform to the general design of the vehicle body. Such tops may be employed with bodies of different types and may be provided in different sizes to meet various individual requirements.

In order to permit an attractive, smooth appearance, the tops provided by the present invention may be arranged so that large sagging fabric sections are avoided. Thus when a cover of fabric or flexible sheet material is employed, the major portion of the contour of the top may be distinctly defined by rigid shell sections having only relatively small gaps therebetween which are bridged by the covering fabric. Accordingly the tendency of the fabric to sag does not result in objectionable alteration of the appearance of the top. Furthermore, the sections may be arranged upon folding so that sharp bends or creases in the fabric or undue strains upon localized portions thereof are avoided, while the fabric may also be protected against chafing or pinching.

In accordance with other embodiments of this invention, a top may be provided having a single, solid body section cooperating with a separate movable rear panel. Such a top may have substantially all of the advantages of a permanent top and in addition may permit the advantages of an open car. The tops of this type which are disclosed herein are characterized by constructions which permit a smooth continuous surface to be provided along substantially the entire side of the top and thus avoid the provision of objectionable cracks or seams in conspicuous locations, a disadvantageous feature of some of the earlier sectional tops. The single seam or crack which may be provided in such a top may be disposed about the rear window in a position analogous to that of the sheet metal seaming in closed car tops or the fabric seaming at the rear of collapsible tops.

In accordance with one aspect of this invention, the top for a one-seated vehicle, i. e., a coupe, may be a single unit so that no exterior seams are necessary.

In any case, I prefer to provide a top which, when raised, may be substantially rigid and form retaining so that, for example, when the top is covered by a thick layer of snow, no substantial change in its form will result and so that substantial protection is afforded to the occupants of the vehicle in case of serious accident. Such a top of rigid or semi-rigid construction may be provided with satisfactory heat-insulating qualities and may have a good interior appearance, while, furthermore, it may be provided with accessories which are usually employed only in permanent tops of the closed-car type, such as, for example, glare screens or shades, rear window curtains, dome lights, and the like.

To permit these desirable results, the present invention provides tops which may have rigid sections or body portions of generally arched form that are received within the rear streamlined tail portion of the vehicle. Thus the vehicle may be provided with a deck or tail portion resembling that which is commonly provided in coupes and roadsters. The top itself or a rigid section thereof may be received within the rear deck, the arched upper portion of this section being juxtaposed to and nested within the similarly shaped cover of the deck. Since the shapes of streamlined rear decks and of modern tops are both characterized by complex double curvatures, the individual shaping of a top and a deck to receive the same requires the working out of exact contours of these respective parts to suit the individual design. An important characteristic of the present invention is the arrangement of the top and associated parts so that the lowered top does not need to be lowered into the limited space between the rear wheel housings but rather may be over and/or behind the same. Another important feature of this invention is the arrangement of a top in this manner so that the top fits relatively close to the upper part of the deck and a substantial luggage space is provided within and below the lowered top. Furthermore, various features of this invention facilitate access to the storage space thus provided below the lowered top.

This invention also provides tops which may be easily lifted or lowered either by manual manipulation or which are readily adapted to the provision of mechanical lifting arrangements. If desired, such tops may be manually movable but may be provided with assist mechanism to aid the operator in lifting and lowering the top. Such mechanism preferably may include a counterbalancing spring or springs to bear part of the weight of the top as it is being moved between its lowered and raised positions. The invention also provides tops having rigid arch-like sections over the region of the rear seat of a two-seated vehicle, thus to provide substantial protection for the occupants of the rear seat and to aid in assuring the maintenance of a proper contour under all conditions. Since the windshield standards may be relatively strong, the superstructure of a vehicle having such a rigid rear arch-like section may afford effective protection for the occupants of both the front and rear seat, even in case of a serious accident. In the case of rigid tops, constructions may be provided to permit relatively light weight, employing, for example, several interconnected tubular sections so that a relatively strong structure is provided capable of supporting the weight of the vehicle should the latter be overturned.

The above and further objects and advantageous features of the invention will be apparent to those skilled in the art upon a reading of the subjoined description and claims in conjunction with the accompanying drawings, in which:

Fig. 6 is a central vertical section of a top such as is illustrated in Fig. 5, showing the top in its contracted condition, the dot and dash lines illustrating the position of the front portion of the top when the latter is extended;

Fig. 7 is a side elevation of the rear portion of a vehicle body with another form of top, the lowered top being shown in dot and dash lines;

Fig. 8 is a central vertical section of the front portion of the top illustrated in Fig. 7;

Fig. 9 is a side elevation of the rear part of a vehicle body with a dot and dash line showing of another form of lowered top;

Fig. 10 is a plan view of the structural portion of the top shown in Fig. 9;

Fig. 11 is a diagrammatic sectional view of such a top;

Fig. 12 is a central sectional view of the front portion of the top in its folded condition;

Fig. 13 is a side elevation of this portion of the folded top;

Fig. 14 is a section on line 14—14 of Fig. 10;

Fig. 15 is a section on line 15—15 of Fig. 13;

Fig. 16 is a section on line 16—16 of Fig. 10;

Fig. 17 is a top plan view of the front portion of another type of top in its normal extended condition;

Fig. 18 is a similar view of the front portion of such a top in its contracted position;

Fig. 19 is a section on line 19—19 of Fig. 17;

Fig. 23 is a view partly in side elevation and partly in section of the rear part of the body and the top shown in Fig. 20;

Fig. 24 is a side elevation of the rear part of a vehicle body having a rigid top, the lowered top being shown by dot and dash lines;

Fig. 25 is a plan view of one side of the rear portion of the body shown in Fig. 24, certain parts being shown in optional positions by dot and dash lines;

Fig. 26 is a section on line 26—26 of Fig. 24;

Fig. 27 is a transverse section of the body in the region of the hinge axis of the rear door, but showing the top in its lowered position;

Fig. 28 is a central vertical section of the rear deck of the body shown in Fig. 24, the top being shown in its lowered position and the door for the deck being shown in its raised position by dot and dash lines;

Fig. 29 is a rear elevation of a half of the body shown in Fig. 24;

Fig. 30 is a sectional detail of a portion of the top and the body, showing fastening means for the former;

Fig. 31 is a similar view of a portion of the assembly shown in Fig. 30, but showing optional means which may be associated with the same when the top is lowered;

Fig. 32 is a view similar to Fig. 24, but showing another form of top;

Fig. 33 is a view similar to Fig. 25, but showing the form of top illustrated in Fig. 32;

Fig. 34 is a bottom view of the top shown in Figs. 32 and 33;

Fig. 35 is an enlarged section indicated by line 35—35 of Fig. 34, the parts, however, being arranged in their normal rather than in their inverted positions;

Fig. 36 is a view of the rear deck of the body illustrated in Fig. 32 with a portion of the outer covering of the body and certain parts removed;

Fig. 37 is a central longitudinal sectional view of the rear deck portion of the body shown in Fig. 32, the top being shown in its lowered position;

Figs. 38 and 39 are sectional details of portions of the rear deck;

Fig. 40 is a section indicated by line 40—40 of Fig. 36, but showing the left-hand side of the deck;

Fig. 41 is a view of a portion of the body shown in Fig. 32, but with parts removed and with parts of the top broken away;

Fig. 42 is a plan view of a portion of the body shown in Fig. 32, illustrating the arrangement of this body adjoining the end of the rear seat;

Fig. 43 is a sectional view of a part of the top guiding assembly;

Fig. 44 is a rear elevational detail of a portion of the assist mechanism employed with a top of the type shown in Fig. 32;

Fig. 45 is an inside view of a portion of the top shown in Fig. 32, particularly illustrating the rear fastening means for this top;

Fig. 46 is a front elevation of a part of the assembly shown in Fig. 45;

Fig. 47 is a bottom view of the same;

Fig. 48 is a sectional detail of the front fastening means employed with tops of the type disclosed herein;

Fig. 49 is a sectional detail of the front portion of a top showing the arrangement of a glare screen in conjunction with the same;

Figs. 50 and 51 are sectional details of the assembly shown in Fig. 49;

Figs. 52 and 53 are respectively sectional and elevational details of the fastening arrangement for securing the rear section of the top illustrated in Fig. 32 to the body portion thereof;

Fig. 54 is a top plan view of a half of the rear portion of an optional type of body and top;

Fig. 55 is a side elevation of a body and top of the type illustrated in Fig. 54;

Fig. 56 is a longitudinal section showing a detail of the arrangement of the top illustrated in Fig. 55 as well as related parts; and Fig. 57 is a detail view partly in plan and partly in horizontal section and somewhat diagrammatic in character, showing the same assembly as illustrated in Fig. 56.

The accompanying drawings illustrate several preferred adaptations of the present invention to individual body types and to meet individual commercial requirements, it being evident that the various conditions of price limitation, current style trends, and satisfaction of individual preferences which characterize the automobile industry necessitate the provision of various individual designs to meet particular requirements. It is furthermore to be contemplated that certain features which may be illustrated with one of the several embodiments shown herein may be used with other of said embodiments, and such combinations are regarded as within the purview of the present invention.

Figure 1:
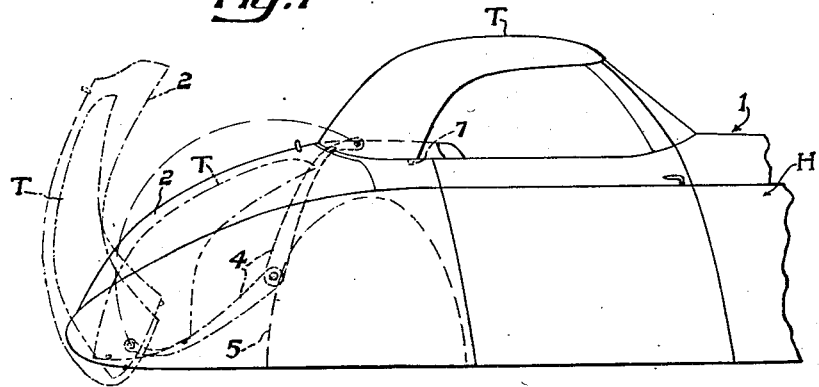
Fig. 1 is a side elevation of the rear portion of a vehicle body provided with a top capable of being lowered to a position within or beneath the rear deck, the top being shown in its lowered position by dot and dash lines and being shown in a third optional position which it occupies when the door of the rear deck is opened.

Referring to Fig. 1, the body 1 may be of the general type disclosed in my copending application Serial No. 1967, being, however, of the single seated or coupe type and having a unitary top T which may be constructed of any suitable material such, for example, as sheet metal. As illustrated, the body 1 may be provided with a continuous housing H extending along its side in the manner disclosed in my above-identified application, although in so far as the principles of the present invention are concerned, the body might, for example, be provided with conventional rear mud guards having conventional streamlined tail portions. The body 1 is provided with a rear deck having a relatively large door 2 which has a generally streamline form and which is disposed between the tail portions of the housings H. This door is provided with hinge means within or adjoining the tail portions of the housings so that it may swing to the open position shown in dot and dash lines.

The top T may be provided with arms 4 pivoted to the opposite sides of its rear portion, these arms being pivotally mounted adjoining the rear parts of the wheel housings 5. The arms 4 may extend through notches in the lower edge of the rear wall of the top and over a small part of the fixed wall 8 of the deck in front of the door 2. Notches 9 are provided in the rear edge of wall 8; the arms 4 may extend through these notches when the top is raised, a small portion of each arm then being exposed. Below their exposed portions, the arms 4 curve outwardly so that they are spaced sufficiently to receive the nose of the top therebetween.

The top T has tapered studs 7 which may be received in complementary sockets in the body walsl. The raised top T may be secured to the windshield standards by any suitable means, such as fastening bolts of the conventional type. When the top T is to be lowered, such fastening means are disconnected and the door 2 is swung to its open position. Thereupon the top is swung rearwardly until it nests within the raised door 2 in the position shown at the left of Fig. 1. In this position of the top the pivotal connections between the top and the arms 4 lie between and substantially coincide with the pivotal supports for the door 2, i. e., the axes of the pivots are in substantial alignment; accordingly the top may maintain the same position relative to the door when the latter is lowered to normal position.

Figures 2, 4:
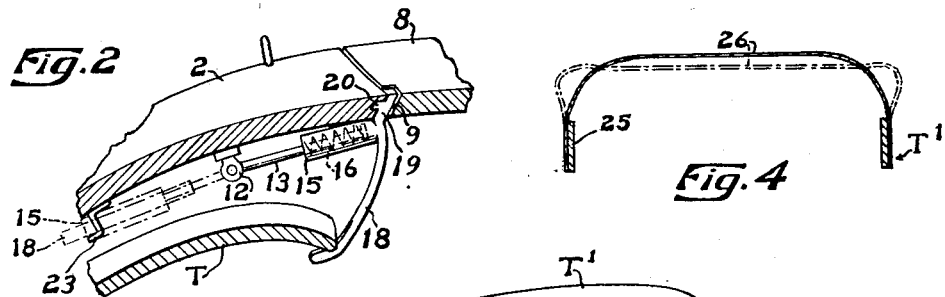
Fig. 2 is a sectional detail of the rear deck of the body shown in Fig. 1, a portion of the lowered top and adjoining parts of the vehicle also being shown.
Fig. 4 is a horizontal sectional view, somewhat diagrammatic in character, of the rear part of the top shown in Fig. 3.

In order to aid in holding the top in this manner and also to occupy the notches 9 which otherwise would be left open when the top is lowered, I provide a pair of similar devices, one of which is illustrated in Fig. 2. Such a device may comprise a bracket 12 secured to door 2 and pivotally supporting a rod 13. This rod has a head received within a cylinder 15 and engaging a compression spring 16. Secured to the end of the cylinder is a hook 18 which may be movable under the front end of the lowered top T. Extending also from the cylinder 15 is a block 19 having a lug 20 engageable within a recess in the front of the door 2 so that when the assembly is in the position shown in full lines in Fig. 2 the block 19 occupies the recess or notch 9, the upper surface of this block being flush with the upper surface of the deck. When the top is raised, the cylinder 15 with the rod 13 may be swung about the pivotal connection in the bracket 12 and the cylinder may be turned a quarter turn about its own axis relative to the rod, so that the parts may occupy the position shown in dot and dash lines, whereupon the hook 18 may engage a bracket 23 on the inside of the door 2, thus supporting the assembly in juxtaposition to the door. It is evident that the spring 16 is effective in holding the lug 20 within the recess at the front of the door when the assembly is in its full line position and that the spring is similarly effective in holding the hook 18 upon the bracket 23 when the assembly is in its inoperative or dot and dash line position. When the top is to be lowered, the assembly may be moved out of its dot and dash line position and the spring may be compressed so that the nose of the top is engaged by the hook 18, and the lug 20 enters the recess at the front of door 2; thereupon when the door is lowered, the block 19 substantially fills the notch 9 and the front end of the top remains connected to the door 2 to swing therewith.

Figure 3:
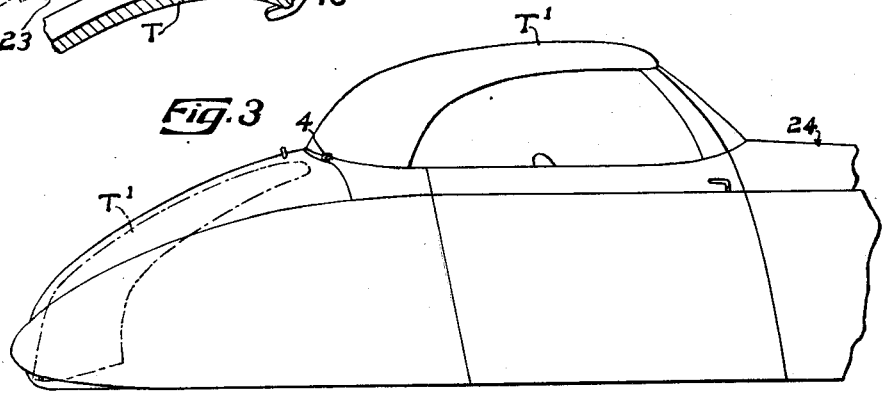
Fig. 3 is a view similar to Fig. 1, but showing an optional form of top.

Fig. 3 illustrates a top T¹ which may be lifted and lowered in the same manner as the previously described top T. However, the top T¹ is somewhat longer than the top T and, for example, may be conveniently employed on a body 24 having closely spaced front and rear seats, for example, a body of the so-called Victoria type. The top T¹, while being swingable on arms 4 in the manner described above, may be provided with a rear portion which is somewhat distortable so that the effective length of the lowered top may be somewhat reduced to permit the top to be received in a smaller storage space than otherwise would be possible. Thus, for example, the shell portion of the top may be provided with a rigid arch-like part 25 (Fig. 4) to extend over the rear seat and with a distortable rear section 26 which may assume the shape shown in dot and dash lines in Fig. 4 when the top is lowered. Devices of the type shown in Fig. 2 also may be employed with the top T¹.

Figure 5:
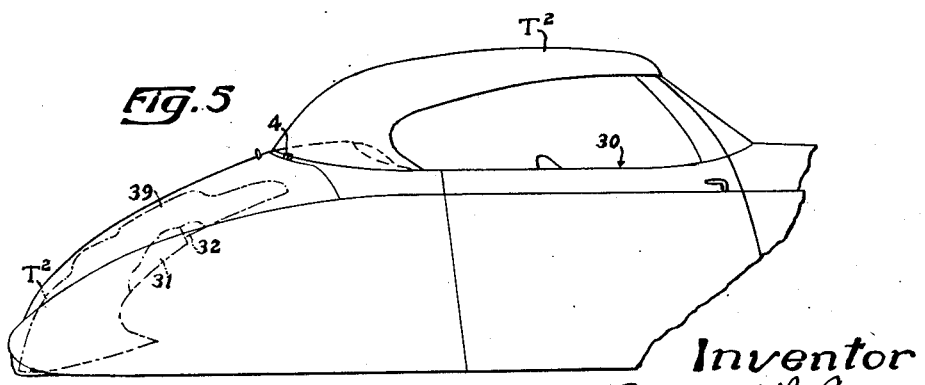
Fig. 5 is a side elevation similar to Fig. 1, but showing a body having another type of top.

Fig. 5 illustrates a top T² which may be associated with a body 30 having a somewhat longer passenger compartment than a body of the type illustrated in Fig. 3. As shown in Fig. 6, the top T² may include a rigid rear section 31 and a rigid nose portion 32, these portions being slidably connected to each other by bars 33 fixed to the nose section and slidably received within sleeves 36 upon the sides of the rear section 31. The front portion of the rear section may be beveled, as designated by numeral 37, and may support a sheet metal apron 38 which is fixed to the nose section 32 and slides over the rear section 31 when the top is collapsed. The apron 38 may be slightly distortable but maintains a substantially rigid structure between the spaced sections 31 and 32 when the top is in normal position.

A top of this type may be provided with a fabric covering secured to the rear part of the rigid rear section and the front part of the corresponding front section but being free of connection to the top structure between these sections, so that when the top is collapsed the fabric may bulge upwardly, as designated by numeral 39 in Fig. 5. It is evident that the top T² as well as the top T¹ may provide a rigid arched assembly over the rear seat.

Fig. 7 shows a top T³ which may have the same dimensions as the top T² and which may be supported on swinging arms 4 in the same general manner. This top, however, may have an intermediate portion which may be bent downwardly or folded with a substantial curvature so that sharp bending or creasing of the fabric covering of the top is avoided. Thus, as shown in dot and dash lines in Fig. 7, the nose portion of the top may be folded downwardly and inwardly so that it is disposed at an acute angle to the adjoining rear part of the top. When the rear door 42 of the body 40 illustrated in Fig. 7 is swung to its open position, i. e., to a position corresponding to the dot and dash line position of the door 2 of Fig. 1, the nose portion of the top may be strapped or otherwise secured to the door. When the door is closed, the nose portion is disposed over the wheel housings 43.

As shown in Fig. 8, suitable connections may be provided between the solid or rigid rear section 44 of the top T³ and its nose portion 45. A wide variety of connections may be provided for this purpose, but I prefer to provide arrangements whereby a substantially continuous support is provided for the top fabric so that only a small space or small spaces are afforded which are bridged by the fabric without direct underlying supporting means. Furthermore, I prefer to provide structure of this type which is normally rigid under an imposed load, for example when a thick layer of snow is on the top or a heavy object is being supported by the same.

Furthermore, it is desirable to arrange the folding portion of the top so that the top fabric is not stretched as the top folds. Obviously it would be structurally feasible and is within the broad purview of the invention to make a folding top of this character with a plurality of solid sections connected by conventional hinges having parallel horizontal axes. With such hinge arrangements, however, when the top is folded, the fabric would be stretched between the edges of the sections and thus subjected to substantial strains and distorted out of its normal form.

The arrangement shown in Fig. 8 not only affords a substantially continuous support for the covering fabric with but a single gap where the fabric is not directly supported, but also provides a structure which does not tend to collapse when subjected to substantial downward pressure, and an arrangement which permits the effective circumferential extent of the folded portion of the top to be less than the extent of this same portion when unfolded, so that the fabric, rather than being stretched, is somewhat loosened or relaxed when the top is folded. For this purpose the rear section 44 may be connected by a long transverse hinge 46 to a sector bar 47, the lower end of which has pivotal connections 48 with a similar forwardly and upwardly inclined bar 49. The latter in turn may be connected by a hinge 46 to a rigid sector section 50 which in turn is connected by a hinge 46 to the nose portion 45.

The sector bars 47 and 49 may normally be held in the illustrated angular relation to each other by toggle links 53, while toggle links 54 may connect the rear bar 47 to the rear section 44, toggle links 56 connecting the front bar to the rigid sector section 50, and similar links 57 connecting the latter to the nose portion 45. Obviously when a top of this type is folded, the toggle links 53, 54, 56 and 57 are actuated so that the hinged sections may swing relative to each other, bringing the upper portions of the bars 47 and 49 into close juxtaposition. Accordingly the effective extent of the outer portion of the folded top may be less than the extent of this portion of the top when in its normal raised position.

It is furthermore evident that the sector bars may have abutment surfaces cooperating with corresponding surfaces of the rear section and the sector section so that the bending or buckling of the top under a substantially downwardly imposed load is prevented, a similar arrangement being employed between the sector section 50 and the nose portion 46. Furthermore, under such conditions the links 54, 56 and 57 are subjected to tensile strains which they are admirably adapted to withstand, while the links 53 are subjected to compressive stresses.

As shown in Fig. 9, a top $T^4$ may be provided which is somewhat longer than the top $T^3$ and which may be used on a body 60 having a longer passenger compartment, the top $T^4$, however, being arranged to be received in a deck of the same size as shown in Fig. 7. Thus the nose portion of the top $T^4$ may be folded back substantially in parallelism to the rear body portion thereof, as shown in dot and dash lines in Fig. 9. For this purpose a folding assembly of the general type illustrated in Fig. 8 may be provided but an additional rigid sector section or an additional pair of sector bars may be afforded if desired. However, folding tops of the type illustrated in Figs. 7 and 9 may be provided with other folding arrangements, such as are illustrated in Figs. 10 to 14 inclusive.

Fig. 10 shows the rigid rear section 61 of the top $T^4$ and a plurality of rigid sector sections 62 which are disposed between the rear section 61 and the nose portion 63. Suitable leaf hinges 65 connect these parts to one another. It will be noted from an inspection of Fig. 10, for example, that the rear sector portion 62 is provided with hinge means at its opposite ends. Thus the hinge 65 connecting the rear sector to the rear section is at one end of the sector while the hinge connecting it to the adjoining sector is at its opposite end, the other bars being similarly arranged. The sector bars 62 may be shaped so that the adjoining faces of each pair of bars at the ends remote from their hinge connections define V-shaped slots or recesses 67, these slots each having a form corresponding to that of a narrow isosceles triangle. Where the bars 62 are connected to the front and rear sections of the top, V-shaped slots 68 of substantially one-half the size of the slots 67 may be provided. In other words, the front edge of the rear section and the rear edge of the nose portion may extend at right angles to the longitudinal median plane of the top.

The hinges 65 are arranged so that their axes are inclined in relation to a horizontal plane, as diagrammatically indicated by the position of the axis lines $a-a$, in relation to the sector bar 62, shown in Fig. 11. Thus the axis lines $a-a$ are spaced above the top in the region of each of the V-shaped recesses 67 and in the region of each of the recesses 68. As shown in Fig. 16, the sector bars 62 may be connected to each other and to the rear section and the nose portion by toggle links 69. When the links are manipulated to cause folding of the top, the sections pivot relative to each other about the axes $a-a$. Thus, for example, referring to Fig. 16, the rear sector bar 62 will swing about a center directly above the front edge of the rear section 61, such a center being indicated by the heavy dot marked $a'$ in Fig. 16, the center $a'$ obviously lying in the corresponding axis line $a-a$. Similarly the intermediate sector bars 62 will swing relative to each other about a center $a''$ and the portion 63 will similarly swing relatively to the front sector bar about a center $a'''$ lying in the corresponding axis line $a-a$.

Thus when the top is folded, the parts assume the relative position shown in Fig. 12, the adjoining faces of the sector bars being in direct juxtaposition to each other, i. e., the gaps 67 being closed. Similarly the edge of the rear section 61 will be directly juxtaposed to the rear bar 62, the corresponding V-shaped slot being closed and the corresponding slot 68 at the front of the top will similarly be closed. Since the gaps are thus closed, the overall extent of the folded top is less than its extent when in the normal position illustrated in Fig. 16. Accordingly the fabric F may extend loosely about the sector bars 62 and is not subjected to strains at the corners or angular junctures between adjoining bars. It is furthermore evident that the fabric F is not sharply bent or creased but that it is only bent about an arc of large radius so that the fabric does not tend to become permanently distorted.

As shown in Fig. 14, when the top is raised the hinges 65 have angular leaf portions, surfaces of which may directly engage each other, thus providing rigid abutment faces cooperating with the pintle pins of the hinges in enabling the top sturdily to withstand heavy loads and thus substantially to obviate undesirable tendencies to sag. Obviously the fabric F is directly supported by the underlying portions of the raised top structure except for the narrow slots 67 and 68.

As shown in Figs. 13 and 15, the top $T^4$ may be provided with a valance of the general type disclosed in my United States Patent No. 1,826,865, such a valance 70 having a beveled lower portion readily to engage an upwardly moving window and having a gutter portion thereabove. The outer face of the margin of the fabric F may be cemented to the valance, and the inner face of this portion of the fabric may be secured to a thin resilient metal ribbon 72 which affords a backing for the fabric between the lower parts of the sector sections 62. When the top is folded, due to the shape of the fabric covering and due to the provision of the metal ribbon 72, the valance will assume a shape of the general type illustrated in Fig. 13. Thus crumpling of the side portions of the fabric cover in the region of the sectors is avoided, despite the downward curvature of the fabric at the sides of the raised top.

Figs. 17, 18 and 19 illustrate portions of an optional top structure which may be contractible so that, when the top is lowered, the fabric may bulge upwardly in the manner illustrated in Fig. 5. This form of top may have a rear section 81 which, if desired, may be similar to the rear section 61. This top is provided with pairs of bars 82 and 83 which have shorter transversely extending front and rear edges at their opposite ends and longer angularly disposed edges at obtuse angles to the shorter edges. The sector bars 82 and 83 are connected to each other and to the rear and nose sections of the tops by pivot members 85 providing vertical axes at the junctures of the longer and shorter edges. Thus the rear bar 82 may have an edge face extending transversely of the top, i. e., in a plane at right angles to the median plane of the top and abutting a similar edge face of the rear section 81. The opposite end of this bar may have a corresponding transversely extending front edge portion engaging a similar edge portion of the adjoining bar 83. Between the hinge connections 85 and the remote ends of the sector bars their edges extend in divergent directions. Thus a series of V-shaped recesses 87 are provided between the bars, these recesses alternately occurring at opposite sides of the top, while between the bars and the rear and nose sections of the top corresponding V-shaped recesses 89 may be provided, these recesses having one-half the width of the recesses 87.

When the top is contracted, the longer surfaces of the sector bars which were previously disposed in angular positions are swung to positions wherein they abut and extend transversely of the top, i. e., at right angles to its median plane as illustrated in Fig. 18, while the previously abutting surfaces are swung to diagonal positions and small V-shaped gaps or slots appear between the same.

As shown in Fig. 19, each bar 82 may support a metal tongue member 84 which is slidable in a slot in the adjoining bar 83. The inner end of the tongue may continue to engage the groove even when the top is collapsed. Similar connections may also be provided between the sector bars and the front and rear sections of the top. Thus the connections afforded by the pivot bars are reinforced and the ability of the top to withstand superposed loads is enhanced.

Figure 20:
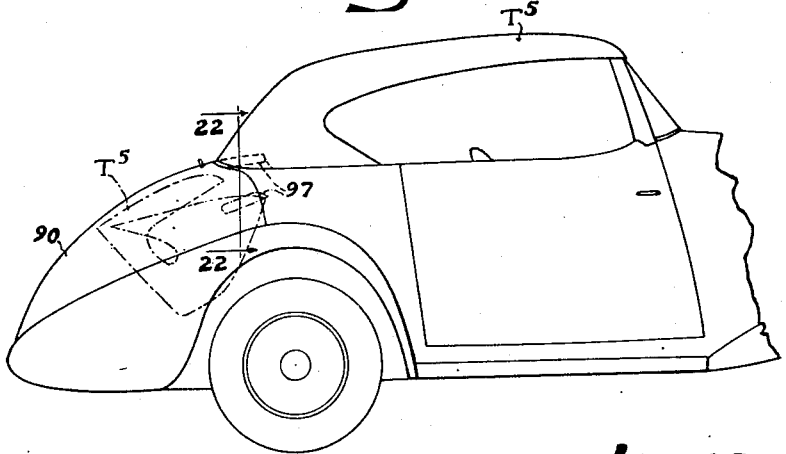
Fig. 20 is a side elevation of the rear part of a vehicle body with the folded top shown in dot and dash lines.

Fig. 20 shows a top T⁵ which may be foldable in the general manner described with reference to the tops T³ and T⁴ but which has an intermediate rigid section between its rigid nose portion and its rigid rear section. This top may also be connected to a rotatable supporting means arranged at the front of the rear deck, i. e., for example, behind the rear seat, and the top may be swung to a folded position shown in dot and dash lines in Fig. 20 where its transversely arched nose portion is disposed within the correspondingly shaped door 90 of the rear deck.

Figures 21, 22:
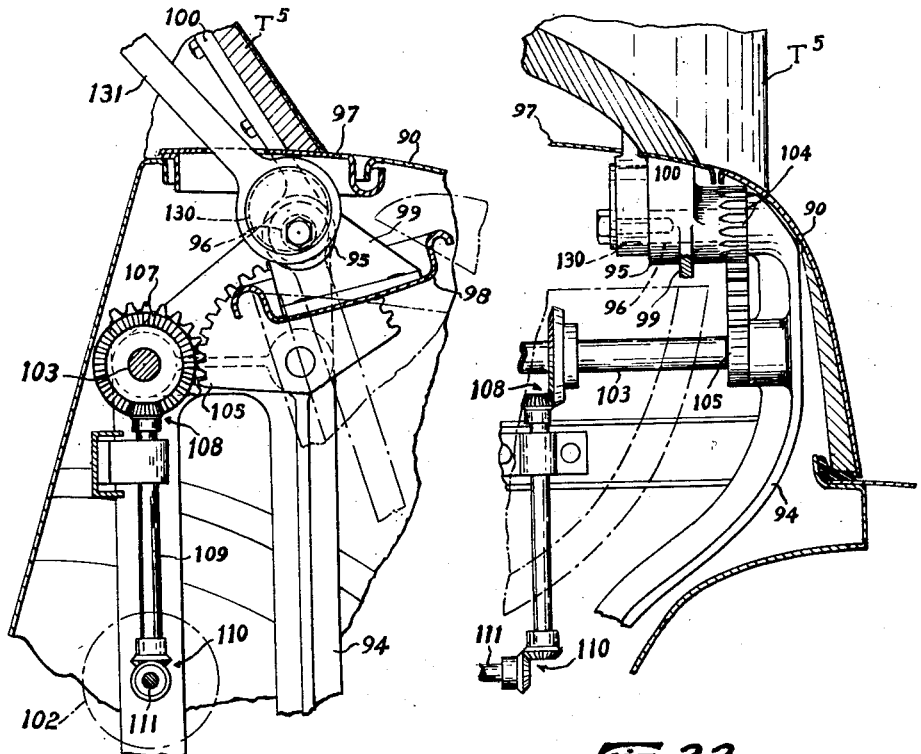
Fig. 21 is a longitudinal sectional view of a part of the body illustrated in Fig. 20, showing the rear portion of the top and related parts.
Fig. 22 is a section indicated by line 22—22 of Fig. 20.

The door 90 may be pivotally supported at its rear end, as particularly shown in Fig. 23, and in front of this door a movable lid member 97 may be provided and secured to the top. A second lid member 98 (Fig. 21) may be arranged to move into the opening in front of the door 90 when the top is lowered. As shown in Fig. 22, a sleeve 95 may be rotatably mounted on a stud 96 projecting from a bracket 94 at each side of the body to support the top T⁵ and the lids 97 and 98. An arm 99 extending from each sleeve 95 is connected to the portion of the lid 98 which is concealed when the latter is in its normal position. Each side of the top T⁵ is provided with an arm 100 which also extends from the sleeve 95 at that side of the body, so that the top may swing about the center defined by the studs 96. The sleeves 95 may be provided with teeth 104 which mesh with the teeth of sectors 105 rotatable on stub shafts extending from brackets 94. The sectors 105 may be driven by sectors 107 on a transverse shaft 103, so that the top T⁵ may be mechanically lifted and lowered while the lid 98 is being mechanically lowered or lifted. Thus, for example, the shaft 103 may be connected by beveled gears 108 and a shaft 109 as well as beveled gears 110 to a drive shaft 111 extending from any suitable driving motor which, for example, may be a small electric motor 102; obviously additional reduction gearing may be associated with the motor, if desired.

The top T⁵ may also be arranged so that its intermediate section 112 is connected to its rear section 113 by suitable hinge means so that these sections may move into direct juxtaposition when the top is folded but so that these sections are slightly spaced when the top is raised. Such a hinge means may cause the top sections to swing relative to each other about an axis b, as indicated in Fig. 23. For this purpose, the sections 113 and 112 may be provided with leaf hinges having diagonally disposed pintles, the axes of which intersect in the region of the point b. Thus the section 113 may be provided with a hinge portion 117 having a diagonally disposed knuckle and pintle pin assembly connected to the plate 116 of an intermediate hinge, this intermediate hinge having a knuckle portion 118 connecting its sections 116 and 119. The axis of this knuckle portion is disposed substantially along a line bisecting the angle between the diagonal hinges. The hinge plate 119 is similar to the plate 117 and is connected to a hinge plate 120 on the intermediate section 112. When the top is folded, the barrel portion 118 of the intermediate hinge may move inwardly so that the diagonally disposed knuckle portions of hinge sections 117 and 120 are brought into juxtaposition and the gap between the members 113 and 112 is substantially closed.

In accordance with this invention, mechanical means may be provided to cause such a folding movement of the front and intermediate sections when the top is lowered. For this purpose, as shown in Figs. 21 and 22, an eccentric 130 may be fixed to each stud 96 and may engage a suitable collar at the lower end of an actuating bar 131. The upper end of this bar is pivotally connected to a crank arm 133 which swings about a pivotal support fixed on the rear section 113. The upper end of the actuating link 131 also has a ball and socket connection with an intermediate link 132, the front end of which has a similar connection with an arm 135 projecting inwardly from the hinge plate 117.

As the top moves toward its folded position, the eccentric is effective in pulling the actuating rod 131 toward the stud 96 about which the top is swinging, the upper end of this rod being guided in an arcuate path by the crank 133 so that the rear end of the intermediate link 132 is drawn toward the rear of the top, causing the plate 116 to swing inwardly and causing the knuckle 118 to be disposed out of the plane of the hinge portions 117 and 120 and the knuckles of these portions to move into juxtaposition.

The member 97, being fixed to the top, obviously moves downwardly to the position shown in dotted lines in Fig. 20. As this movement occurs, the lid 98 swings upwardly so that it may be juxtaposed to and substantially aligned with the door 90. Obviously when the top is lifted, these various motions are reversed.

It is evident that the folded top T⁵ has its rear portion disposed adjoining the wheel housings so that these parts may limit the swinging movement of the top. The front section of this top may be pivotally connected to its intermediate position by hinge means of the same character as has been described so that when the top is collapsed its overall extent is less than when it is in its normal raised position and the strain upon the fabric of the top is relaxed. Obviously, if desired, suitable linkage may be provided to cause the automatic folding of the nose section relative to the intermediate section, but I prefer to depend upon manual manipulation for this purpose.

Figs. 24 et seq. illustrate tops of a somewhat different type from those which have been described, these tops each having a rigid body portion extending over the front and rear seats of the body and having a much smaller, removable rigid rear panel. The body shown in Fig. 24 may be of substantially the type disclosed in my copending application Serial No. 1967, having a housing H¹ extending along its side and having a rear seat 150 and a front seat 151. Such a body may conveniently be provided with a curved windshield 152 of the type disclosed in my copending application Serial No. 690,331, filed September 21, 1933, and may have its windows arranged to provide a tumble-home effect, i. e., so that they incline upwardly and inwardly (Fig. 29). Accordingly the width of the top may be smaller than would otherwise be feasible for a passenger compartment of a given width, and, due to the windshield arrangement, the front of the top may be disposed somewhat to the rear of the front edge of the front seat. Thus the top may have a single rigid body portion extending over the passenger compartment and yet it may be received in a rear tail portion of the body, which need not have extreme length or unduly bulky proportions.

As illustrated in Fig. 24, the deck or tail portion of this body may be arranged so that its upper surface is substantially aligned with or forms a continuation of the corresponding surface of the top so that a smooth streamline appearance is provided when the vehicle is viewed from the side. This body may be provided with a top T⁶ which extends over the rear seat and in fact may have a rigid arched portion over and somewhat behind the rear seat. Behind this arched portion a rear section or panel 155 may be secured to the body portion of the top to provide therewith a rigid structure.

As shown in dot and dash lines in Fig. 24, the body portion 154 of the top may be lowered as a single unit and received in the rear part of the body, the arched rear portion of the top being nested within the tail portion of the rear deck. For this purpose the top may be supported on casters 158 which roll on suitable tracks 159, shown in dotted lines in Fig. 24.

Another important aspect of this embodiment of the invention is the arrangement of the door 160 at the rear of the body so that it is hollow and the body portion 154 of the top is received in this hollow door. In front of the door, a removable lid 161 may be provided and pivotally mounted wing panels 162 may be arranged at each side of this lid, the lid being removable and the panels swingable outwardly so that an opening is provided through which the body portion of the top may move when it is being lifted or lowered.

Referring to Figs. 26 and 28, it is evident that the door 160 is hollow and has an inner wall 164 upon which the rear part of the lowered body portion of the top may rest. The inner wall 164 curves downwardly at each side and is continued in a substantially horizontal section 159ᵃ which forms the rear part of the track 159. The sheet metal then extends upwardly to provide a diagonal portion 164ᵃ, the upper edge of which is joined to a flange on the outer wall of the door, thus providing a lip 170 which normally engages the inner edge of housing H¹ when the top is lowered. The rear part of the door 160 may be provided with a license plate holder 172 such as disclosed in my design Patent No. 94,296. The flanges 170 at the sides of the door may extend outwardly beyond the side and rear of the upwardly bulged portion of the door at its lower end, being flush with the upper surface of the rear extremities of the housings H¹. Thus, as shown in Fig. 25, the door may have a width greater than the upwardly bulged portion thereof. Accordingly, although the body has a tapered appearance at the rear conforming with aesthetic and streamlining requirements, the lower part of the top carried by the door may be wider than the upwardly bulged tail portion of the body and may move upwardly with the door when the same is raised. The flanges 170 may be provided with handles 173 which may serve to latch the door in its lowered position.

The storage compartment below the lower wall 164 of the door may be provided with a floor panel 175, the sides of which are supported on the chassis frame 176. Above the chassis frame, the storage compartment may be somewhat wider, the floor of this portion of the compartment being provided by a sheet metal member 177 which is connected to the sheet metal of the housing H¹ at each side of the body. It is thus evident that a storage compartment of very ample proportions may be provided beneath the wall 164 of the door.

The front portion of the door is provided with arms 180, shown in Fig. 28, which are pivotally mounted on brackets 181 (Fig. 27) which are supported by the framing of the vehicle. For example, as disclosed in my copending application Serial No. 1967, a vehicle of this type may have a tubular frame member 183 extending downwardly to the rear part of the chassis frame and the bracket 181 may conveniently be secured to this tubular member. The arms 180 may be provided with portions 186 extending in front of their pivotal supports and having hooked ends for connection to suitable counterbalancing springs if desired. Such springs (not shown) may be arranged to aid in counterbalancing the weight of the door and preferably may be arranged so that when the door is unlatched, it springs upwardly if the top is not lowered. When the top is disposed in the door, these springs may not only counterbalance the weight of the door, but also aid in lifting the rear part of the top, which is carried by the door. Obviously the door 160 may be provided with the conventional type of toggle bracing (not shown) to hold the door in raised position.

In front of the door 160 the body may be provided with an arched sheet metal panel 188, the front end of which is secured to a transverse tubular member 189, which may form a part of the body framing and which conveniently connects the members 183 at opposite sides of the body as disclosed in my copending application Serial No. 1967. The sides of the member 188 provide the front portions 159ᵇ of the track 159, as shown in Figs. 27 and 28, and are supported b᷈ the front portions of panels 177. The arched portion of member 188 is conveniently arranged to support the rear section 155 of the top, the front or nose portion of the lowered top being disposed above this rear section, as shown in Figs. 27 and 28. Also as shown in dot and dash lines in Fig. 28, when the door is opened the front part of the nose portion may swing downwardly somewhat, ample room being allowed for this movement due to the substantially horizontal positioning of the panel 188 and due to the arrangement of the pivotal supports for the door 160 substantially in front of that door. Parts 178 of panel 188 (Figs. 27 and 28) are bulged downwardly adjoining the tracks portions 159b to accommodate the sides of panel 155. The floor panel 175 may extend upwardly below panel 188 to afford a portion 175a over the space which may be occupied by the conventional fuel tank.

The lid 161 has a rear edge which is normally juxtaposed to the front of the door 160 and has parallel side edges so that it may be slid forwardly when released and disconnected from the remainder of the body. Thus when the top is being lifted and lowered, this panel may conveniently be disposed on the rear seat. The wing panels 162 are pivotally mounted on the sides of the body at either side of the lid 161. For this purpose, brackets 193 may be provided (Fig. 25). The rear corners of lid 161 are supported by the brackets 193 and its front edge normally rests on brackets secured to the back of the rear seat (Fig. 28). When the front ends of the wing panels 162 are released, they may swing outwardly to the position shown in dot and dash lines in Fig. 25. Thus when the lid 161 is removed and the panels 162 are swung outwardly, an opening is provided in front of the door 160, through which the top T⁶ may move, the top being disconnected from the windshield standards and being rolled downwardly along the track 159.

In order to hold the panels 161 and 162 in their normal positions, locking means of the type shown in Fig. 30 may be provided. Such locking means may comprise a cylindrical guide 195 carried by the side of the top. A locking bolt 196 is slidably mounted in this cylinder and a coil compression spring 197 is disposed between the upper end of the cylinder 195 and a handle 198 which is fixed to a bar 199 connected to the bolt. Accordingly the spring tends to hold the bolt 196 in retracted position where its upper end engages the upper end of the cylinder 195 so that the bolt does not project below the lower edge of the top to interfere with its movement on the casters 158. When the top is in normal position and the panels 161 and 162 are properly located, the handle 198 may be pressed downwardly to compress the spring 197 and to slide the bolt downwardly beyond the lower edge of the top. A bracket 200 may extend upwardly from the frame member 183 and may provide a generally cylindrical bore to receive the bolt 196. This bore, however, is provided with a lug to engage the hooked portion of the lower end of the bolt 196, as shown in Fig. 30, thus to hold the bolt when it is swung to its locking position. Each wing panel 162 is provided with an opening 201 (Fig. 25) through which the bolt 196 may slide and the edge of each panel normally extends over the edge of a flange 202 on the lid 161 to hold the latter in place.

Behind the opening 201 a hinge 203 provides a substantially horizontal axis about which a small trap door 204 may swing. When the top is lowered the edge of this door 204 is supported on the flange 202 (Fig. 31); when the top is raised the door occupies the depending position shown in Fig. 30, thus leaving an opening through which the bracket 205 for caster 158 may extend.

When the top is to be lowered, the connections with the windshield standard may be disconnected and the handles 198 be turned to disengage the hooked ends of bolts 196 from brackets 200 so that the springs 197 cause the bolts to slide upwardly. When the bolts have thus been released at each side of the vehicle, the rear end of the top may be lifted slightly so that the panels 162 may be swung outwardly, the panel 161 then being removed and disposed, for example, on the rear seat. While this is being done, the front end of the top is disconnected from the windshield standards, but may continue to rest thereon. The rear section 155 may then be disconnected from the body portion of the top and be laid on the fixed panel 188 in the position shown in Fig. 28. Thereupon the front end of the top may be lifted from the windshield standards and the top may roll downwardly, the casters moving along the track 159 until the top reaches the position illustrated in Fig. 28.

After the top has been lowered in this manner, the lid 161 may be returned to its normal position and the wing panels 162 swung back into their normal positions, the edges of the doors 204 being disposed on flanges 202. Thereupon bolts 210 shaped to be received in the brackets 200 may be inserted through the openings in the panels 162. These bolts may conveniently have heads 211 of bright metal and may be provided with rubber washers 212 to prevent rattling. When the top is to be raised, this general procedure is reversed, the bolts 211 being removed, the panels 162 swung outwardly, and the lid 161 removed. The top may then be pulled upwardly, the casters 158 following the tracks 159 until the front end of the top may be disposed upon the tops of the windshield standards. Thereupon the rear section 155 may be lifted out of the body and may be secured to the main portion of the top, any suitable means being provided for this purpose, such as turnbuttons of the type which will be described with reference to another embodiment of this invention.

Thereupon the rear of the top may be lifted slightly to permit the panel 161 to be slid into place and to permit the wing panels 162 to be moved back to normal position while the doors 204 are disposed in depending position. The handles 198 may then be actuated to lock the rear of the top in place, the front of the top then being locked to the windshield standards.

Fig. 32 shows a body having a rigid top T⁷ with a removable panel 300, the body portion, however, being rigid and unitary to provide an arched portion over the rear seat and the passenger compartment of the vehicle. Such a body may be provided with a rear deck D. This construction is also characterized by an arrangement of tracks and casters permitting the top to be rolled to its lowered or raised position, and the rigid body portion of the top is similarly received in the rear portion of the body. In accordance with this embodiment of the invention, however, the top is not movable into the door of the rear storage compartment. A door 301 may be arranged at the rear of the deck D, the front edge of this door being connected by a small piano hinge to a fixed sheet metal portion 302 of the deck. In front of this sheet metal portion I provide a single movable lid 303 which may be slid or rolled rearwardly in a manner which will be described to provide an opening through which the top may be moved from raised to lowered position.

The top itself may be formed of any suitable material; for example, synthetic plastics may be employed with a metal framing, or a metal construction may be provided, such as illustrated in Figs. 34 and 35. Such a construction may be characterized by a single outer metal sheet 305 which may be of fairly thin gauge metal. This sheet cooperates with various members of irregular channel form to provide a rigid structure, the reinforcing members being flanged and having their flanges welded to the sheet 306 to provide tubular portions, thus combining lightness with strength and rigidity.

As shown, for example, in Fig. 35, the side of the sheet 306 may have a flange welded to a flange of a reinforcing member 307 which extends along the side of the top and is formed of metal of substantially heavier gauge than the sheet 306. The flanges of the members 306 and 307 may be arranged to provide a depending rib 308 which may support a rubber valance strip against which the inner face of the window panel or panels may abut. The member 307 is also provided with an upper flange 309 which is also welded to the sheet 306. Diagonally disposed members 310 of channel-like cross section and having outwardly extending flanges 311 may cross each other at the center of the top and have their ends connected to the members 307, it being obvious that the flanges 311 are welded to the cover sheet 306.

At the rear of the top an arch-like reinforcement 320 may be provided with flanges 321 welded to the sheet 306; this member may have a cross section of distorted channel form, its section preferably being deeper at the opposite sides of the top than at the horizontal part of the member which extends over the rear seat; thus adequate head-room may be afforded. It is furthermore evident, as shown in Fig. 34, that this member inclines upwardly and forwardly and that its rear flange may be engaged by the flanged front portion of the rear panel 300. At the front of the top a cross-member 324 of V-shaped cross section (Fig. 49) may be provided. It is evident that an arrangement of this general character permits a sturdy, rigid, strong and light top to be provided and that a top of this type may have sufficient strength to afford substantial protection to the occupants of the vehicle should the same be overturned in an accident.

The windshield standards may readily be provided with adequate strength to support the weight of the overturned car, while the arched member 320 may also be strong enough for this purpose, the connecting members 307 and 310 serving to afford rigid reinforcements extending between the arched member and the windshield standards.

The rear deck D is provided with an inner shell member 330, the rear part of which is juxtaposed to the rear part of the fixed panel 302 and the front part of the door. Thus a space is provided into which the rear part of the lowered top T⁷ may be received, as shown in Figs. 36 and 37. A marginal flange 331 is provided at the rear of the shell 330 substantially to close the rear of this space. This flange is arranged, however, to form the border for an opening registering with the opening provided when door 301 is swung upwardly to the position shown in dot and dash lines in Fig. 36. Since the rear panel is removed from the lowered top, an opening of this character may be provided to permit access to this storage space within the deck D. The member 330 is provided with a removable panel 330ᵃ so that a somewhat larger opening may be provided, if desired, when the top is raised, to afford easier access to the storage compartment.

The marginal portions of the shell 330 are provided with channel-like edges 334 to provide tracks for the casters supporting the top. Brackets 335 extending from tubular members 183, similar to the members 183 described with reference to Fig. 27, may support and reinforce the intermediate part of each track (Figs. 37 and 40). The front portion of the shell 330 is somewhat depressed to provide a housing to receive not only the front portion of the top T⁷, but also the rear panel 300. This panel may rest upon the front portion of the shell, as shown in Figs. 37 and 40, cleats 337 being provided to engage its edges and hold it in place. In order to permit the top to move downwardly and the opening at the back of the top to straddle the panel 300 in this position, the panel, while of rigid construction, preferably is slightly distortable or resilient so that when the flanges at its edge engage the cleats 337, its width is somewhat reduced and it is slightly buckled so that clearance is provided for the top to straddle both the panel and the retaining cleats.

The lid 303 may be provided with a roller 339 secured below its rear end as shown in Fig. 39. This roller may conveniently be covered with cushioning material, such as rubber, and may be received in a gutter 340 which has an inclined wall portion 341 extending from the fixed panel 302. Thus when the front of the lid is released and it is pushed rearwardly, the roller 339 will roll on the inclined wall 340 until the rear of the lid reaches the position shown in dot and dash lines in Fig. 39, whereupon the lid may be rolled downwardly until a flange at its front end engages the gutter 340 which acts as a stop. Thus an opening is provided through which the top T⁷ may be slid upwardly or downwardly. The depth of the gutter 340 decreases at each side of the roller so that the gutter gradually merges into a substantially flat flange 340ᵃ (Fig. 38) which forms a sealing member extending along the sides of the lid 303.

Hook members 350 may be secured to the back 351 of the rear seat to engage the nose portion of the top and support the same when it is lowered (Figs. 37 and 41). To aid in the raising of the top, assist mechanism may be provided, such as is particularly shown in Figs. 36, 41, 42, 43 and 44. This mechanism may include a transverse tubular member 352 extending between opposite sides of the body and receiving a large tension spring 354 of the coil type therein. A second smaller coil spring 355 may be arranged within the spring 354 if desired. The ends of these springs are connected to cables 356 which are turned about idler pulleys 357 secured at the ends of the member 352. Thus the springs, when under tension, tend to pull each of the cables 356 downwardly and into the tubular member 352. The upper end of each cable 356 is fixed to a conical or helical pulley member 360, this member being arranged to compensate for the varying tension of the springs in accordance with Hook's law so that said cable 356 extends from the largest portion of the conical pulley when the tension of the springs is the weakest and extends from the small diametered portion of the pulley when the tension is greatest.

Fixed to the conical pulley 360 is a conventional pulley or narrow drum 361 to which the end of a cable 362 is fixed, the cable 362 being wrapped about the pulley 361 as the latter rotates. The lower end of each cable 362 is connected to a ball element 363 which normally engages a ring 364 that is connected to the top in a manner which will be described. Thus when the top is lowered, the cable 356 is wound on the conical pulley 360 so that the springs 355 are stretched until their ends are juxtaposed to the ends of the tubular member. As the top moves upwardly, the springs contract and each cable 356 moves onto a larger portion of the pulley 360, thus increasing the effective leverage which are springs exert upon the drums 361 and compensating for the loss of tension in the springs. Accordingly a substantially uniform pull may be imposed upon each side of the top, it being evident that the pulls upon opposite sides of the top are always equalized, since the same springs are effective in pulling on both of the cables 356.

As also shown in Figs. 41 and 42, the front of the lid 301 is provided with a depending flange 370 having rearwardly and upwardly bent ears 371 which may snap into engagement with retaining studs 372, the front of the lid 301 fitting against the rear panel 351 of the seat when the roller 339 is properly positioned in gutter 340.

The sides of the arched portion 320 of the top are secured to castings 380 which afford supports for the rollers 304, each casting being provided with a recess in which the upper part of the corresponding roller is received, as shown particularly in Figs. 45 and 46. A heavy wire or bar 381 extends rearwardly from the casting 380 and has a transverse portion upon which a roller sleeve 383 is rotatably mounted. The rollers 383 may engage guides 384 (Figs. 36, 41 and 43) as the top approaches its raised positions, thus to aid in guiding the nose of the top toward the tops of the windshield standards. The end of the wire 381 beyond the sleeve 383 is bent to provide the ring 364 previously described with reference to the assist mechanism. It is thus evident that when the cables 362 act through the balls 363 in pulling upwardly, the members 381 tend to push on the brackets or castings 380 substantially in a direction parallel to the plane of movement of the axis of the caster and substantially in alignment with that axis. The brackets 380 have their lower faces inclined upwardly and forwardly in a plane paralleling the plane of inclination of the tracks 334 so that these lower faces of the castings may move into engagement with corresponding faces of the fixed brackets 390 which are connected to the bracket assemblies 391 that support the pulleys 360 and 361.

Locking means is provided for a top of this type including a cylindrical guide boss 392 extending upwardly from the side of the arched member 320 and receiving a plug 393 having an opening through which a rod 393a may slide, the upper end of this rod being provided with a handle 394. The lower end of the rod is connected to a locking bolt 395 having a lug 396 which, in the position shown in Fig. 45, may engage beneath the lower surface of a portion of the bracket 390 to hold the top in place. A coiled compression spring 397 is disposed between a flange on the bolt 395 and a boss 398 integral with the casting 380 but disposed within the lower part of member 320. Thus the locking means is of the same general type as described with reference to Fig. 30, and when the handle is pushed down and then turned, the lug 396 catches beneath the member 390 to lock the casting 380 on the bracket 390.

The rear part of the depending portion of casting 380 curves upwardly and inwardly to clear the curved forward edge of the lid 303, a part of which is shown in dot and dash lines in Figs. 45, 46 and 47. It is thus evident that the top may fit about this lid and that the depending portion of the casting 380 which is secured to the bracket 390 is located in front of the curved edge of the lid, as particularly shown in Fig. 47. For this purpose the upper rear corner of the back seat cushion may be distortable so that the forward movement of the top causes this portion of the cushion to be bulged or bent forwardly slightly to afford room for the bracket. When the top moves downwardly, the cushion will normally tend to move back into place, it being evident that no great distortion of the cushion is necessary.

To permit the top $T^7$ to be lowered, the fastenings at the windshield standards and the bolts 395 may be disconnected, whereupon the lid 303 may be slid or rolled rearwardly to provide an opening through which the top may be rolled into deck D. As this movement of the lid is initiated, the rear end of the top may be slightly lifted, the rollers 383 and guides 384 permitting a limited movement of this character while the nose of the top rests on the tops of the windshield standards. As the top moves downwardly, the springs 354 and 355 retard its movement.

When the top is to be raised, the lid 303 is pushed rearwardly; the top is then pulled upwardly with the springs 354 and 355 assisting this movement. When the top starts moving upwardly, its nose portion may be close to the rear seat, but as the movement of the top continues, the guides 384 are effective in swinging the nose upwardly away from the front seat. Thus the person raising the top does not need to support the weight of its front end and he only needs to lift its front end a short distance upwardly to cause it to rest on the windshield standards.

An advantageous feature of tops of the character shown herein is that they provide means permitting the use of the conventional accessories which are ordinarily employed with permanent tops. Thus any of the tops described above which provide rigid rear sections obviously may receive a spring roller shade, if desired, and also glare screens or eye shades may be arranged within the rigid front or nose portion of such a top.

Furthermore, as shown in Fig. 34, a top of this character may be provided with a dome light L or the like. For this purpose it is necessary to provide means to connect the wiring for the light when the top is moved to its raised position. In order to effect this result, I prefer to provide an arrangement of the character shown in Fig. 48, which may be associated with the fastening means for the front of the top. The windshield standard S may have an upper block-like portion 401 received between the face of the narrow front end of the member 307 and a metal loop member 400 connected to this element. The portion 401 of the standard may be provided with a transverse bore 402 receiving the locking bolt 403. This bolt is provided with a control rod 404 slidably received in a cylinder 405 secured to the member 400. The end of rod 404 supports an exposed handle or knob 406. The rod and bolt assembly is provided with a flange 407 between which and the outer end of the cylinder assembly 405 a coiled compression spring 408 may be arranged so that the flange is normally held against a boss extending into the end of cylinder 405 from member 400. However, when the handle 406 is pulled inwardly, the spring may be compressed and the bolt 403 with-drawn from the bore 402 so that the top may be lifted from the standard S.

In order to provide an electrical connection, small passages are drilled in the bolt 403 to receive a flexible wire 410 which may extend into the cylinder 405 and may have a loop portion arranged within the same, the end of this loop portion extending through an opening in the wall of cylinder 405 and from there through one of the channels 310 to the dome light. The bolt 403 is provided with an inserted wedge-like member 416 formed of insulating material and tapered inwardly toward the axis of the bolt and toward the outer part of the top. Embedded in the outer surface of this member is a contact plate 417 to which the end of the wire 410 is welded. A vertical opening is provided in the block 401 of the windshield standard to receive a bolt 420 to the lower end of which a supply wire 421 is connected. The upper part of this bolt is threaded into a nut 422 which has an inwardly inclined face to engage the corresponding face of the member 417. A rubber block is supported in a recess at the bottom of the bore 402 and yieldably urges the nut 422 upwardly to engage the metal contact 417. It is evident that the bore 402 is extended downwardly to receive the insulating block 416 and the metal plate 417. Thus when the top is moved to its normal position and the bolt 403 moves into bore 402, the member 417 presses downwardly upon the nut 422, closing a contact which permits current to pass from wire 421 to wire 410. Such an arrangement may be provided at each side of the top so that the light is supplied by current through two wires rather than through one wire and a grounded connection.

As shown in Figs. 49, 50 and 51, a top of the general type which has been described may have a glare screen or eye shade which may normally be retained in a pocket within the top. The metal of the top may conveniently be lined with suitable sound-deadening and heat-insulating material 441 in which a pocket is provided to receive such a glare screen. Such a screen may have a body portion 440 of translucent Celluloid, the edges of which are secured to metal ribbons 443, these ribbons being resilient. The rear end of each ribbon may be riveted to a metal cross strap 439 which may have ends projecting beyond the ribbons to engage a portion of the front flange of member 324 to act as a stop (Fig. 50) and limit the forward movement of the screen. It is evident that portions of the flanges of the member 324 are depressed to conform to the shape of the pocket receiving the glare screen 440. The front end of the screen may be provided with metal cross straps and a finger pull 444. The pocket preferably is arranged frictionally to engage the screen so that ordinarily the screen does not move downwardly. This action is aided due to the resiliency of the metal strips 343 which normally tend to straighten the screen out but which, being somewhat bowed, frictionally engage the upper and lower surfaces of the pocket. When the finger pull 444 is engaged by the finger of the occcupant of the front seat, for example, the screen 440 may be slid downwardly until rubber elements 447 upon its lower, front edge engage the glass of the windshield, these elements being resiliently pressed against the glass due to the resiliency of members 443. Thus the glare screen may be held in the desired adjusted position.

Figs. 52 and 53 illustrate typical turn-buttons 450 which may be arranged to lock the rear section 300 to the top T⁷. These buttons are pivotally mounted on a flange 453 of the top T⁷ and have end portions which may snap over slightly bulged protuberances 452 on a flange 451 of the rear section 300. Struck-up portions 454 on this flange may limit such a movement of the respective turn-buttons.

Figs. 54 and 55 illustrate an optional top arrangement which may be employed in a body of the general type shown in Fig. 32. However, with this top arrangement the rear deck D¹ is provided with two doors 500 which are hinged at their sides and swing away from each other to afford access to the interior of the deck. The front edge of such a door is indicated by numeral 501 and its outer edge by numeral 502. It is evident that a very large opening may thus be provided through which the top T⁸ may move. The top T⁸ may have a rigid body portion similar to that described with reference to Fig. 32, but has the front edge of its rear section 510 pivotally connected to its body portion as designated by numeral 509. The lower part of the rear section 510 is supported by a pair of arms 511 which are pivotally mounted on brackets 512. Thus the rear section may swing about the brackets and the top may swing relative to the rear section.

This body is also provided with a slidable lid 518 which has parallel sides and may occupy a position wherein its rear edge is juxtaposed to the front edges of the doors 500 when the top is lowered. When the top is raised, the lid may be slid forwardly for a short distance to permit the top and the flange 521 carried by panel 510 to be juxtaposed to the door 500, as shown in Figs. 56 and 57. Thus the top and the associated flanges fill the space thus left when the lid 518 is slightly ahead of its normal position.

The arms 511 may be shaped to provide ledges to support a flange 522 upon the rear of lid 518 in the manner illustrated in Fig. 56, this flange being disposed under lips on the doors 500 when the top is lowered. The flange 521 is provided upon the rear section 510 of the top but similar flanges extend along the top at each side of this rear section to edges in alignment with the side edges 519 of the lid 518.

When the top is to be lowered, the doors 500 are swung to their open positions and the top is swung upwardly so that the pivot 509 follows the arcuate path shown by a dotted line in Fig. 55, the arms 511 and the section 510 in the meantime swinging about the pivotal supports provided by brackets 512. Thus the rear section swings to the lowered position indicated by dot and dash lines in Figs. 54 and 55 and a substantial opening is provided between the sides of the rear portion of the top through which access may be provided to the storage space.

After the top is lowered in this manner, the lid 518 is slid rearwardly until the flange 522 is juxtaposed to the door 500.

When the top is to be raised, the lid is slid forwardly slightly so that room is provided for the lower edge of the rear section 510 as well as the adjoining parts of the top which are disposed laterally inside of the edges of the lid, the lid in this position fitting in juxtaposition to the inner part of the lower edge of the top to close the space thus provided, as diagrammatically indicated in Fig. 57.

Obviously the swinging panel 510 affords swinging means for the top similar to the arms 4 of Fig. 1; such arms may be employed with the top T⁷ rather than the rollers and tracks, if desired. It is also evident that the electrical connections shown in Fig. 48 and the glare screen 5 of Fig. 49 may be used with any of the tops shown herein.

It is evident that the forms of the tops shown herein may be varied as desired; for example, a top of the type shown in Fig. 24 may be lowered in the manner illustrated in Fig. 32 or in Fig. 55. It is to be understood that the foregoing description and the accompanying disclosure are to be regarded as illustrative rather than limitative, and, furthermore, that the following claims are intended fully and in all respects to protect the novelty of this invention, and, to that end, applicant reserves the right, by reissue or otherwise, fully to protect this invention against apparent domination by claims presented by later applicants but phrased to cover structure disclosed herein.

I claim:

1. A vehicle body having a front and a rear seat, a rear transversely arched deck, a lowerable top having a rigid, transversely arched portion extending over the front and rear seats movable into the deck in generally nested relation to the same, said top having a rear panel movable relative to its body portion, said body portion, when lowered, providing a rear opening affording access to a storage compartment within the deck and the lowered body portion.

2. A vehicle body having a rear transversely arched deck, a lowerable top having a rigid, transversely arched and longitudinally curved shell portion movable into the deck in generally nested relation to the same, and mechanism operable to aid the movement of the top from raised to lowered position, said mechanism including a spring and means automatically to compensate for the varying tension of the spring as the top occupies different positions.

3. A vehicle body having a rear transversely arched deck, a lowerable top having a rigid, transversely arched and longitudinally curved shell section, said shell section being received in generally nested relation within said deck when the top is lowered, said shell section having a rear opening, a rear panel, means securing said panel in the opening, said panel being separable from the shell section so that the panel may be separately stored when the top is lowered, a storage compartment within and below said deck and said lowered shell section, said opening permitting ready access to said compartment when the top is lowered.

4. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a door affording access to a storage space, said shell portion when lowered being disposed over said space, the deck and the lowered top being arranged so that access to said space may be obtained even while the top is lowered solely by opening said door.

5. A vehicle body comprising a passenger compartment and a rear deck behind the compartment, said deck providing a swinging door, said door affording a pocket, a lowerable top movable into the deck, said top when lowered having a rigid panel received by said pocket, so that the lowered panel may swing with the door to permit access to be afforded to a storage space within the desk.

6. A vehicle body comprising a passenger compartment, a rear deck behind said compartment, a top movable into a concealed position within the deck, the top having two rigid shell portions defining the major portion of the area of the raised top, one of said portions in its concealed position being nested within the deck in generally parallel relation thereto, and a flexible covering sheet extending over said portions, said sheet being gradually curved when the top is lowered, the radius of curvature of said sheet then being of the order of the total depth of the corresponding part of the raised top.

7. A top according to claim 6 also comprising sheet metal valances extending along the edges of the sheet, said valances being gradually curved when the top is lowered so that the sheet has a substantially straight portion extending between the valances.

8. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a door affording access to a storage space, said shell portion when lowered being disposed over said space, the lowered top being arranged so that access to said space may be obtained even while the top is lowered solely by opening said door, the deck providing a substantially continuous surface which the rear edge of the raised top engages.

9. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a door affording access to a storage space, said shell portion when lowered being disposed over said space, the lowered top being arranged so that access to said space may be obtained even while the top is lowered solely by opening said door, the deck providing a substantially continuous surface which the rear edge of the raised top engages, inclined tracks at the sides of the deck, and rollers on the top movable along the inclined tracks.

10. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a door affording access to a storage space, said shell portion when lowered being disposed over said space, the deck providing a substantially continuous surface which the rear edge of the raised top engages, inclined tracks at the sides of the deck, and rollers on the top movable along the inclined tracks, the door providing a pocket which receives a part of the top when the latter is lowered, said part of the top being movable with the door when the latter is opened to afford access to said storage space, whereby access to said space may be obtained even while the top is lowered solely by opening said door.

11. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a lid at its front end movable to afford an opening through which the top may pass from its raised to its lowered position, said deck including a door behind the lid for affording access to a storage space, said shell portion when lowered being disposed over said space.

12. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a lid at its front end movable to afford an opening through which the top may pass from its raised to its lowered position, and downwardly and rearwardly extending guideways along which said top is movable, the rear of the raised top being disposed over said lid in weather sealing engagement therewith.

13. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck being provided with an opening through which the shell moves to lowered position a storage compartment within said deck, the lowered shell being disposed over said compartment and beneath the outer wall of said deck, and a closure affording access to the compartment even while the shell is lowered.

14. A vehicle body having front and rear seats and a rear transversely arched deck, a lowerable top having a rigid, transversely arched and longitudinally curved shell portion disposed over the rear seat when raised and movable into the deck in generally nested relation to the same, said portion when lowered being tilted upwardly and forwardly relative to its normal raised position, said deck providing a door affording access to a storage space, said shell portion when lowered being disposed over said space, the lowered top being arranged so that access to said space may be obtained even while the top is lowered solely by opening said door, said top having a second rigid portion movably connected to the front of said first portion and lowerable therewith, said portions defining the major portion of the area of the raised top and being arranged so that said rigid sections do not prevent access to said space.

15. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said shell being provided with an opening closed by a rear panel when the top is raised, said deck including a rear door affording access through said last-named opening to a storage space below the lowered shell, the sides of the top adjoining said opening being disposed outwardly of and in straddling relation to fixed structural parts of the vehicle which extend through said opening.

16. A vehicle body comprising a rear deck having a transversely and longitudinally curved outer wall, the upper and forward surface of which is free of corners so that contiguous areas thereof merge into each other to define continuous curved surfaces, a lowerable top which in its raised position is disposed over and engages the upper and forward portion of the deck, the top being movable to a lowered position wherein it is inclined upwardly and forwardly relative to its raised position and is nested in generally parallel relation to said outer wall of the deck, and guiding means directing the top between its raised and lowered positions, said means including fixed guideways and rollers on the top engaging said guideways.

17. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a lid at its front end movable to afford an opening through which the top may pass from its raised to its lowered position, and downwardly and rearwardly extending guideways along which said top is movable, the rear of the raised top being disposed over said lid in weather sealing engagement the rear of the top being movable beyond its normal raised position at the upper end of its path from lowered to raised position to permit movement of the lid to close the opening, whereupon the top is then movable into engagement with the lid.

18. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a lid at its front end movable to afford an opening through which the top may pass from its raised to its lowered position, and downwardly and rearwardly extending guideways along which said top is movable, the rear of the raised top being disposed over said lid in weather sealing engagement therewith, the rear of the raised top being movable upwardly out of engagement with the lid, the latter then being movable substantially in its own plane to afford the opening through which the top may pass, the lid and the adjoining part of the deck providing mutually engaging parts including a roll upon which the lid may move rearwardly to afford said opening.

19. A vehicle body having a rear transversely arched deck, a lowerable top having a rigid, transversely arched and longitudinally curved shell section, said shell section being received in generally nested relation within said deck when the top is lowered, said shell section having a rear opening, a rear panel, means securing said panel in the opening, said panel being separable from the shell section so that the panel may be separately stored when the top is lowered, a compartment within and below said deck and said lowered shell section, said opening permitting ready access to said compartment when the top is lowered, and guiding means defining the path of said shell, said shell straddling said compartment as it moves between its lowered and raised positions.

20. A vehicle body having a rear transversely arched deck, a lowerable top having a rigid, transversely arched and longitudinally curved shell section, said shell section being received in generally nested relation within said deck when the top is lowered, said shell section having a rear opening, a rear panel, means securing said panel in the opening, said panel being separable from the shell section so that the panel may be separately stored when the top is lowered, and guiding means defining the path of said shell, a support to receive said panel, said shell straddling said support as the shell passes from lowered to raised position.

21. A vehicle body comprising a rear deck having a transversely and longitudinally curved outer wall, the upper and forward surface of which is free of corners so that contiguous areas thereof merge into each other to define continuous curved surfaces, a lowerable top which in its raised position is disposed over and engages the upper and forward portion of the deck, the top being movable to a lowered position wherein it is inclined upwardly and forwardly relative to its raised position and is nested in generally parallel relation to said outer wall of the deck, downwardly inclined guide rails at either side of the deck, rolls mounted at the sides of the top and normally resting on said rails as the top moves between its raised and lowered position, upper guides at each side of the deck, rolls at the sides of the top normally engageable with the lower surfaces of the upper guides as the top passes towards its raised position, the last-named rolls being movable downwardly out of engagement with the upper guides in response to a lifting of the front end of the top, the rear of the top being movable upwardly above its raised position to permit a portion of the deck to be moved to uncover an opening through which the top may pass.

22. A vehicle body comprising a rear deck having a transversely and longitudinally curved outer wall, the upper and forward surface of which is free of corners so that contiguous areas thereof merge into each other to define continuous curved surfaces, a lowerable top which in its raised position is disposed over and engages the upper and forward portion of the deck, the top being movable to a lowered position wherein it is inclined upwardly and forwardly relative to its raised position and is nested in generally parallel relation to said outer wall of the deck, downwardly inclined guide rails at either side of the deck, rolls mounted at the sides of the top and normally resting on said rails as the top moves between its raised and lowered position, upper guides at each side of the deck, rolls at the sides of the top normally engageable with the lower surfaces of the upper guides as the top passes towards its raised position, the last-named rolls being movable downwardly out of engagement with the upper guides in response to a lifting of the front end of the top, each upper guide having but a fraction of the length of the corresponding guide rail and being engageable by one of the last-named rolls only after the top has left its lowered position.

23. A vehicle body comprising a rear deck having a transversely and longitudinally curved outer wall, the upper and forward surface of which is free of corners so that contiguous areas thereof merge into each other to define continuous curved surfaces, a lowerable top which in its raised position is disposed over and engages the upper and forward portion of the deck, the top being movable to a lowered position wherein it is inclined upwardly and forwardly relative to its raised position and is nested in generally parallel relation to said outer wall of the deck, guiding means directing the top between its raised and lowered positions, said means including fixed guideways and rollers on the top engaging said guideways, and brackets on the top and body respectively providing cooperating upwardly and forwardly inclined surfaces which are engageable when the top is raised, and elongate holddown elements extending through openings in said brackets and intersecting the planes of said surfaces.

24. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck having an opening at its forward end through which the shell moves to lowered position, the deck having an outer wall section behind the opening, which section remains fixed while the shell moves between raised and lowered positions and which extends over the mid portion of the lowered shell and between the opposite sides of the deck.

25. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said deck providing a door affording access to a storage space, said shell portion when lowered being disposed over said space, a swinging member articulated to a fixed part of the vehicle and having a pivotal connection with the shell, said door swinging about an axis which substantially coincides with the axis of said pivotal connection, the lowered shell being swingable with the door so that access to said space may be obtained even while the top is lowered by opening said door and swinging the top about said pivotal connection.

26. A vehicle body having a rear transversely arched deck, a lowerable top having a rigid, transversely arched and longitudinally curved shell portion movable into the deck in generally nested relation to the same, said portion when lowered being tilted upwardly and forwardly relative to its normal raised position, said shell being provided with an opening closed by a rear panel when the top is raised, said deck including a rear door affording access through said last-named opening to a storage space below the lowered shell.

27. A vehicle body of the type recited in claim 26 wherein said rear panel has a pivotal connection with a fixed part of the body and is swingable to a lowered position.

28. A vehicle body of the type recited in claim 26 wherein said rear panel is pivotally connected to the top, said panel being movable to a lowered position as the top is being moved to its position.

29. A vehicle body of the type recited in claim 26 wherein said rear panel is articulated both to the top and to a fixed part of the body and is swingable into a lowered position as the top is being moved toward its lowered position.

RAYMOND L. CARR.